(12) United States Patent
Ziehl

(10) Patent No.: US 12,104,981 B2
(45) Date of Patent: *Oct. 1, 2024

(54) SENSING IN TIRES FOR ROLLING RESISTANCE

(71) Applicant: University of South Carolina, Columbia, SC (US)

(72) Inventor: Paul Ziehl, Irmo, SC (US)

(73) Assignee: University of South Carolina, Columbia, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/171,425

(22) Filed: Feb. 20, 2023

(65) Prior Publication Data

US 2023/0204462 A1   Jun. 29, 2023

Related U.S. Application Data

(63) Continuation of application No. 17/098,570, filed on Nov. 16, 2020, now Pat. No. 11,592,358.

(60) Provisional application No. 62/935,294, filed on Nov. 14, 2019.

(51) Int. Cl.
| | |
|---|---|
| *G01M 17/02* | (2006.01) |
| *B33Y 80/00* | (2015.01) |
| *B60C 19/00* | (2006.01) |
| *G01L 1/14* | (2006.01) |
| *G01L 1/22* | (2006.01) |
| *G01L 1/24* | (2006.01) |

(52) U.S. Cl.
CPC ............. *G01M 17/02* (2013.01); *B60C 19/00* (2013.01); *G01L 1/146* (2013.01); *G01L 1/22* (2013.01); *G01L 1/242* (2013.01); *B33Y 80/00* (2014.12); *B60C 2019/004* (2013.01)

(58) Field of Classification Search
None
See application file for complete search history.

(56) References Cited

U.S. PATENT DOCUMENTS

| | | |
|---|---|---|
| 8,141,415 B2 | 3/2012 | Inoue et al. |
| 2009/0301183 A1 | 12/2009 | Jenniges et al. |
| 2013/0068006 A1 | 3/2013 | Cuttino |
| 2019/0178753 A1 | 6/2019 | Chang |

FOREIGN PATENT DOCUMENTS

| | | | | |
|---|---|---|---|---|
| CN | 101281096 B | * | 10/2011 | ........... B60C 23/064 |
| EP | 1795881 A1 | * | 6/2007 | ........... B60C 23/064 |

* cited by examiner

*Primary Examiner* — Peter J Macchiarolo
*Assistant Examiner* — Jermaine L Jenkins
(74) *Attorney, Agent, or Firm* — Offit Kurman; Douglas L. Lineberry

(57) ABSTRACT

Described herein are systems and methods for determination of rolling resistance from a sensor or sensors in a tire or tires for application in smart cars to provide feedback to interested parties, such as Departments of Transportation or tire manufacturers.

15 Claims, 19 Drawing Sheets

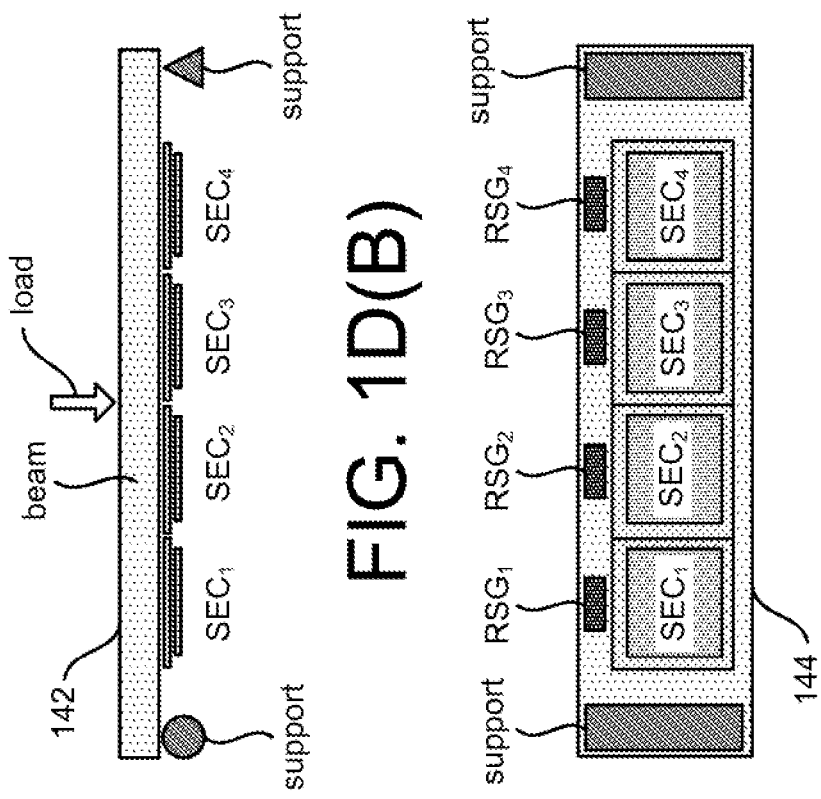
FIG. 1D(B)
FIG. 1D(C)
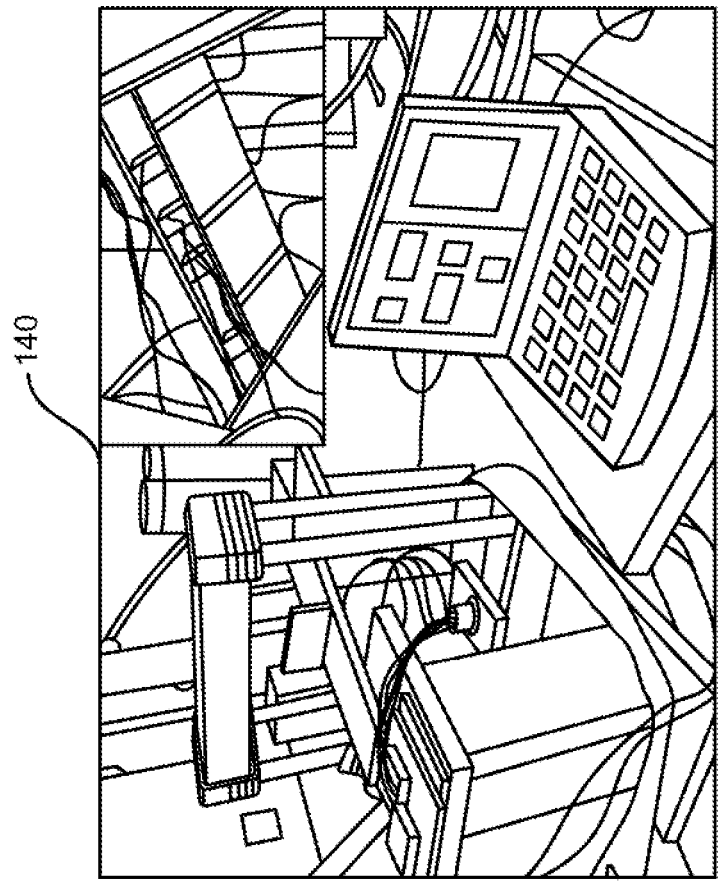
FIG. 1D(A)

SENSING IN TIRES FOR ROLLING RESISTANCE

TECHNICAL FIELD

The subject matter disclosed herein is generally directed to systems and methods for determining rolling resistance from a sensor(s) in a tire(s) for application in smart cars to provide feedback to interested parties, such as Departments of Transportation or tire manufacturers.

BACKGROUND

Rolling resistance is force or energy that resists the movement of a rolling body. Decreasing rolling resistance improves overall vehicle efficiency, increases vehicle range, and decreases emissions. According to the Alternative Fuels Data Center, "an estimated 5% to 15% of passenger car fuel consumption is used just to overcome rolling resistance." https://www.tirebuyer.com/education/rolling-resistance-and-fuel-economy Rolling resistance is caused by: (1) deformation in a tire as it rolls; and (2) road surface. Rolling resistance includes mechanical energy losses due to aerodynamic drag associated with rolling, friction between the tire and road and between the tire and rim, and energy losses taking place within the structure of the tire. Due to the weight of the vehicle, the bottom part of a tire flattens as it rolls, the part of the tire that flattens changes. This constant changing of shape leads to increased resistance. Further, different pavement materials and surface textures lead to different rolling resistances. Smoother roads create less rolling resistance than rougher roads.

Accordingly, it is an object of the present disclosure to provide systems and methods for comparing how tires react over range and weather conditions in order to provide rolling resistance data for the life of a tire.

Citation or identification of any document in this application is not an admission that such a document is available as prior art to the present disclosure.

SUMMARY

The above objectives are accomplished according to the present disclosure by providing in a first embodiment a system for monitoring rolling resistance across a road. The system may include a vehicle with at least one tire where the tire has at least one tire sensor incorporated into the tire, and movement of the at least one tire across a road surface impacts the at least one tire sensor and provides rolling resistance data for the at least one tire. Further, the at least one tire sensor may be a soft elastomeric capacitor. Further yet, the at least one tire sensor may be on an exterior surface of the tire. Still, the at least one tire sensor may be placed within an interior structure of the at least one tire. Yet again, the system may measure energy loss that contributes to rolling resistance of the at least one tire. Again, the system may include an integrated roadway section. Moreover, the integrated roadway system may include a precast concrete section with at least one sensor embedded within the precast concrete. Further yet, the at least one tire sensor may measure strain in at least two directions. Still more, deformation of the at least one tire may be measured to determine rolling resistance. Yet again, the at least one tire may have an airless support structure. Further again, the at least one tire may be a 3-D printed tire. Still yet, the at least one tire may be formed from a biodegradable polymer. Yet moreover, tread may be printed on an outer surface of the 3-D printed tire.

In a further embodiment, a method is provided for calculating rolling resistance across a road. The method may include forming at least one tire having at least one tire sensor incorporated into a structure of the tire, placing the tire on a vehicle, placing at least one force sensor within a suspension of the vehicle in communication with the at least one tire sensor, and movement of the at least one tire across a road surface impacts that at least one tire sensor and provides rolling resistance data for the at least one tire. Further, the at least one tire sensor may be a soft elastomeric capacitor. Still yet, the at least one tire sensor may be placed on an exterior surface of the tire. Again, the at least one tire sensor may be placed within an interior structure of the at least one tire. Still moreover, the method may include measuring energy loss that contributes to rolling resistance of the at least one tire. Yet still, the method may include driving the vehicle over an integrated roadway section. Further yet, the at least one tire may be formed with an airless support structure.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 1D shows a laboratory setup for four SECs: (a) general setup with four SECs installed on the bottom of the beam; (b) setup schematic—from side; and (c) setup schematic—from under the beam.

Figure 1A:
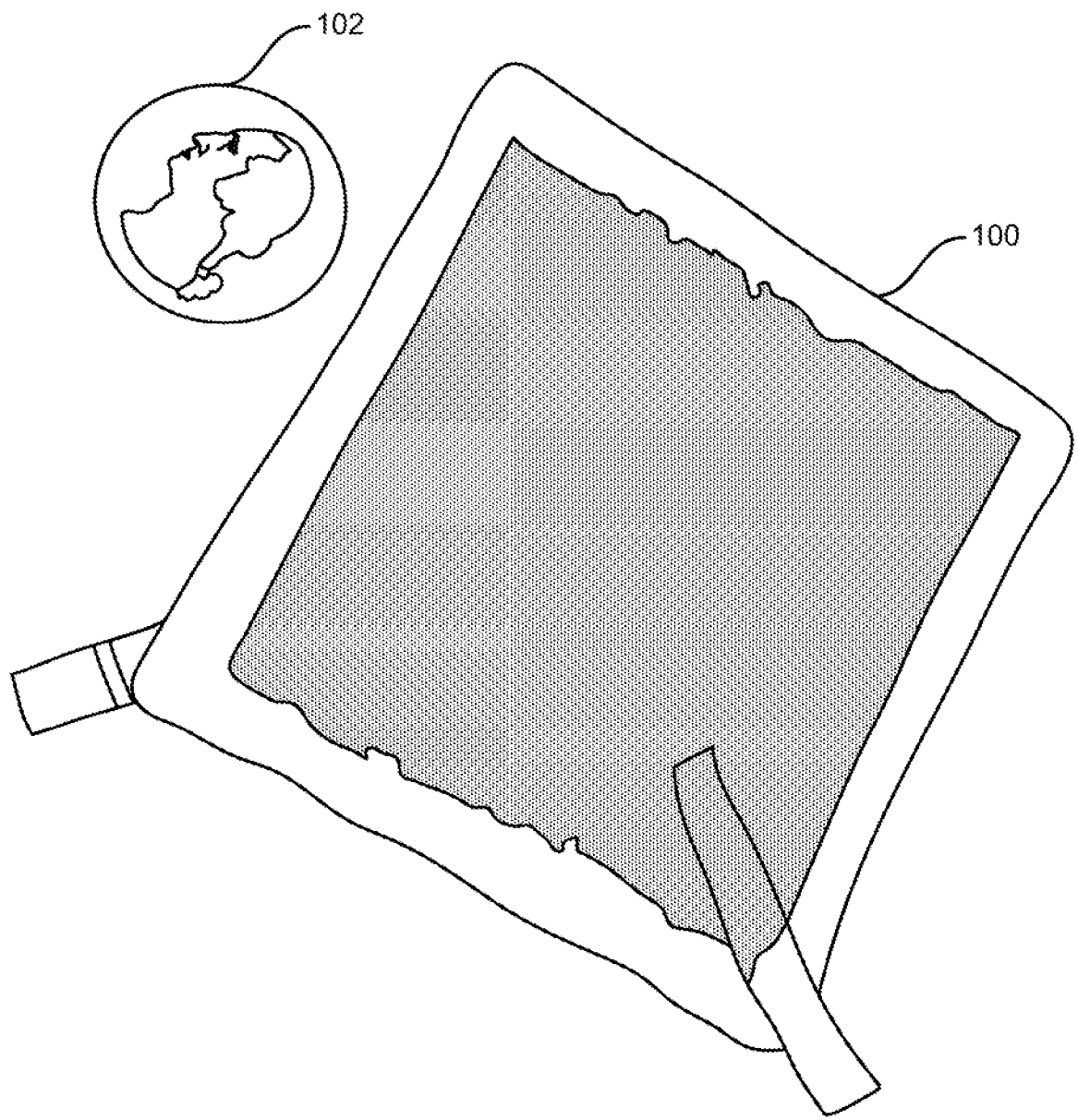
FIG. 1A shows an example of a Soft Elastomeric Capacitor.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, "polymer" refers to molecules made up of monomers repeat units linked together. "Polymers" are understood to include, but are not limited to, homopolymers, copolymers, such as for example, block, graft, random and alternating copolymers, terpolymers, etc. and blends and modifications thereof. "A polymer" can be can be a three-dimensional network (e.g. the repeat units are linked together left and right, front and back, up and down), a two-dimensional network (e.g. the repeat units are linked together left, right, up, and down in a sheet form), or a one-dimensional network (e.g. the repeat units are linked left and right to form a chain). "Polymers" can be composed, natural monomers or synthetic monomers and combinations thereof. The polymers can be biologic (e.g. the monomers are biologically important (e.g. an amino acid), natural, or synthetic.

As used herein, the terms "weight percent," "wt %," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

The current disclosure provides systems and methods for measuring rolling resistance across roads. It is beneficial to compare how one tire compares to the another over range and weather conditions. The current disclosure, meanwhile, provides rolling resistance data for life of the tire. This enables quantification of a tire's efficiency, which can be reported to the driver. This system may also be used to measure deterioration of roads over time via comparing a first new tire's performance at one time period to a similar make/model new tire over the same stretch of roadway at a future point.

Field applications of existing sensing solutions to structural health monitoring (SHM) of civil structures are limited. This is due to economical and/or technical challenges in deploying existing sensing solutions to monitor geometrically large systems. To realize the full potential of SHM solutions, it is imperative to develop scalable cost-effective sensing strategies. One solution as presented herein is to incorporate a network of soft elastomeric capacitors (SECs) deployed in an array form. For example, these may be deployed on the surface of a tire or embedded within the tire's structure. Further, at least one SEC may be used or a group may be used in concert. FIG. 1A shows a SEC 100 that may be employed with the current disclosure with a quarter 102 shown for scale.

Compared with other existing sensing solutions, SEC sensors are an alternative/addition to fiber optics. With both fiber optic sensors and the SEC technology, strain data can be measured over large systems. The SEC network offers the advantages of being 1) cost-effective; 2) operable at low frequencies; 3) mechanically robust; 4) low-powered; 5) easy to install onto surfaces; and 6) customizable in shapes and sizes. The proof-of-concept of the SEC technology has been demonstrated by the authors with an off-the-shelf flexible capacitor. In certain embodiments, a nanoparticle mix may also be employed with the SEC.

Each SEC acts as a surface strain gage transducing local strain into changes in capacitance. Results show that the sensor network can track strain history above levels of 25με using an inexpensive off-the-shelf data acquisition system. Tests at large strains show that the sensor's sensitivity is almost linear over strain levels of 0-20%. It is possible to reconstruct deflection shapes for a simply supported beam subjected to quasi-static loads, with accuracy comparable to resistive strain gages.

In this disclosure, sensors measure strain in two directions. The sensors can provide information as to how a tire deforms as it rolls and interacts with pavement.

The relationship between stress and strain is one of the most fundamental concepts from the study of the mechanics of materials and is of paramount importance to a stress analyst. Here, we apply a given load, the weight of the vehicle on the tire with at least one sensor, and then measure the strain on the tire. We then use the stress-strain relationships to compute the stresses in the tire(s). When a force is applied to a body, the body deforms. In the general case, this deformation is called strain. In this application note, we will be more specific and define the term STRAIN to mean deformation per unit length or fractional change in length and give it the symbol, ε. This is the strain that we typically measure with a bonded resistance strain gage. Strain may be either tensile (positive) or compressive (negative). When this is written in equation form, $\varepsilon = \Delta L/L$, we can see that strain is a ratio and, therefore, dimensionless. As described to this point, strain is fractional change in length and is directly measurable. Strain of this type is also often referred to as normal strain.

Another type of strain, called shearing strain, is a measure of angular distortion. Shearing strain is also directly measurable, but not as easily as normal strain. If we had a thick book sitting on a table top and we applied a force parallel to the covers, we could see the shears train by observing the edges of the pages. Shearing strain, Y, is defined as the angular change in radians between two line segments that were orthogonal in the undeformed state. Since this angle is very small for most materials, shearing strain is approximated by the tangent and angle.

Poisson strain, such as that measured for a bar after deformation due to a tension force, indicate that the bar not only elongates but that its girth contracts. This contraction is a strain in the transverse direction due to a property of the material known as Poisson's Ratio. Poisson's ratio, V, is defined as the negative ratio of the strain in the transverse direction to the strain in the longitudinal direction. It is interesting to note that no stress is associated with the Poisson strain. While forces and strains are measurable quantities used by the designer and stress analyst, stress is the term used to compare the loading applied to a material with its ability to carry the load. Stress refers to force per unit area on a given plane within a body. The bar uniaxial tensile force, F, applied along the x-axis. If we assume the force to be uniformly distributed over the cross-sectional area, A, the "average" stress on the plane of the section is F/A. This stress is perpendicular to the plane and is called normal stress, σ. Expressed in equation form, $\sigma = F/A$, and is denoted in units of force per unit area. Since the normal stress is in the x direction and there is no component of force in the y direction, there is no normal stress in that direction. The normal stress is in the positive x direction and is tensile.

Just as there are two types of strain, there is also a second type of stress called shear stress. Where normal stress is normal to the designated plane, shear stress is parallel to the plane and has the symbol T.

Here, the SECs may measure in at least two directions, such as the Y and X plane, Y and Z plane, the X and Z plane, etc., with respect to a tire and its deformation.

SECs are composed of thin flexible dielectrics, coated on both sides with electrodes. As the SECs stretch, the electrodes get closer together and the change in capacitance is measured. Algorithms analyze these changes and create models that show the deformation of the tire. These sensors may be used to find the energy loss due to the deformation of the tire. This information may then be combined with force sensors, for instance in the suspension system of the vehicle employing the tire(s), in order to determine most of the energy loss that contributes to rolling resistance. Vehicle herein includes bicycles, automobiles, trucks, trailers, ATVs, etc., as known to those of skill in the art.

Some materials, when subjected to force, can change their resistance values. These are known as Force-Sensing Resistors. These materials are used to produce sensors that can measure Force. Force Sensors measure the amount of force applied to an object. By observing the amount of change in the resistance values of force-sensing resistors, the applied force can be calculated. The general working principle of Force Sensors is that they respond to the applied force and convert the value into a measurable quantity. There are various types of Force Sensors available in the market based on various sensing elements. Most of the Force Sensors are designed using Force-Sensing Resistors. These sensors consist of a sensing film and electrodes. Various force sensors may be applied to the vehicle structure such as force sensors such as load cells, pneumatic load cells, capacitive load cells, strain gauge load cells, hydraulic load cells, force transducers, bending beams/shear beams, tension links, load pins, compression force transducers, etc., as known to those of skill in the art. Other examples may include foil strain gauges (FSG) that offer a high degree of geometric variability and feature a high accuracy from 0.01% of FS. Even the smallest forces can be reliably measured by such force sensors. The strain gauges are glued to the deformation body and the measuring ranges are from 0 . . . 0.5 N to 0 . . . 10,000 kN. Thin-film technology is the favored variant in many, even complex, applications. Its advantage is cost efficiency. Force transducers with thin-film sensors are very cost-effective for special manufacture or OEM applications and also for safety-related applications due to their redundant output signals. In addition, they provide high robustness and high long-term stability. Through the sputtering process, the measuring bridge of the force sensor is atomically connected to the measuring cell body. The measuring ranges of these force transducers cover from 0 . . . 1 kN to 0 . . . 10,000 kN. Hydraulic force measurement uses a combination of piston and case, with various seals, as a sensor unit. Due to its easy handling, its robustness and its operation without power supply, this form of force measurement is valued by users. The measuring ranges extend from 0 . . . 160 N to 0 . . . 10,000 kN. The force sensors of the current disclosure may be placed in communication with the SECs described herein, which determine energy loss due to tire deformation, and the combined sensors can determine most of the energy loss that contributes to rolling resistance.

The working principle of a Force-sensing resistor is based on the property of 'Contact Resistance'. Force-sensing resistors contain a conductive polymer film that changes its resistance in a predictable manner when force is applied on its surface. This film consists of, sub-micrometers sized, electrically conducting and non-conducting particles arranged in a matrix. When force is applied to the surface of this film, the microsized particle touches the sensor electrodes, changing the resistance of the film. The amount of change caused to the resistance values gives the measure of the amount of force applied.

Sensor Fabrication

Figure 1B:
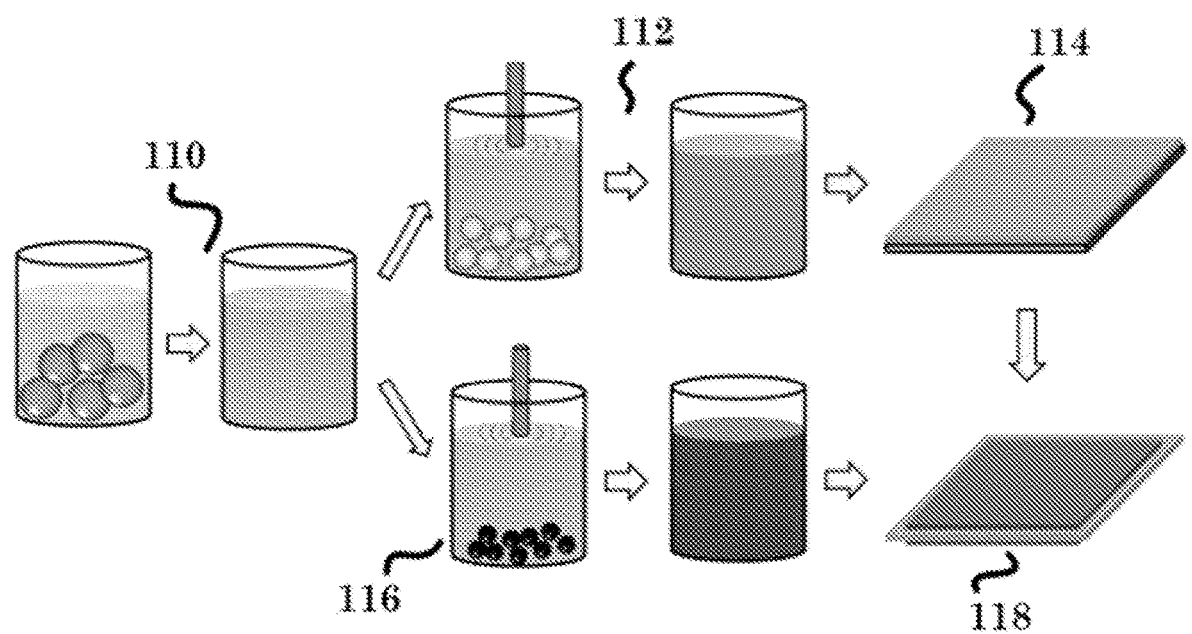
FIG. 1B shows one possible method of sensor fabrication for the present disclosure.

The sensing hardware developed for strain sensing over-large surfaces is an array of SECs acting as large-scale surface strain gages. Each SEC may be composed of a nanocom-posite mix of SEBS (Dryflex 500120) doped with rutile $TiO_2$ (Sachtleben R 320 D) serving as a dielectric for the capacitor. The $TiO_2$ is selected to increase the materials permittivity and robustness with respect to mechanical tempering. This dielectric is sandwiched between compliant electrodes fabricated with the same SEBS mixed with CB particles (Printex XE 2-B). FIG. 1A shows a single SEC. FIG. 1B illustrates the fabrication process of a SEC. The process is initiated by the fabrication of a SEBS/toluene solution. Part of this solution is used to create the nanoparticle mix, in which $TiO_2$ particles are added and dispersed using an ultrasonic tip. The resulting mix is drop-casted on a glass slide, and dried over 5 days to allow complete evaporation of the solvent. Meanwhile, the remaining SEBS/toluene solution is used to create the compliant electrodes. Here, CB particles are added instead of $TiO_2$ to create a conductive mix. Finally, the CB mix is sprayed or painted on both surfaces of the dried polymer.

FIG. 1B shows one possible method of making SECs of the current disclosure. The method includes dissolving SEBS in toluene 110, adding $TiO_2$ and dispersing same with sonication 112, drop-casting the resulting SEBS-$TiO_2$ solution on a glass slide 114, adding CB and dispersing same using sonication 116, and painting a CB solution on the SEBS-$TiO_2$ polymer 118.

Sensing Principle

The capacitance C of a SEC is written:

$$C = e_0 e_r \frac{A}{h} \quad (1)$$

the dielectric. Given a unidirectional strain in the length l of the sensor ($\Delta w=0$, due to the epoxy), a small change in C can be obtained from Eq. (1) by expressing the differential $\Delta C$ as:

$$\Delta C = \left(\frac{\Delta l}{l} - \frac{\Delta h}{h}\right)C \quad (2)$$

The Poisson ratio of pure SEBS materials has been re-ported to be 0.49. The elastomer can be assumed to be incompressible, where the nominal volume $V=w \cdot l \cdot h$ will be preserved after the SEC geometric deformations $\Delta t$ and $\Delta h$:

$$w \cdot l \cdot h = (l + \Delta l)(h + \Delta h)w \quad (3)$$

$$\frac{\Delta l}{l} \approx -\frac{\Delta h}{h}$$

In now follows from Eqs. (1) to (3) that:

$$\frac{\Delta C}{\Delta l} = 2\frac{e_0 e_r w}{h} \text{ or } \frac{\Delta C}{\varepsilon_s} = 2C \quad (4)$$

Where $\varepsilon_s$ is the sensor strain. Eq. (4) represents the sensitivity of the sensor. This sensitivity can be increased by decreasing the SEC thickness, increasing the width, or in-creasing the dielectric permittivity, which is attained by altering the nanocomposite mix. It is therefore possible to customize the sensitivity for a given geometry. For the SEC shown in FIG. 1A (C≈595 pf, w=l=70 mm, h=0.3 mm), the resulting sensitivity is:

$$\frac{\Delta C}{\Delta l} = 17.0 \text{ pF/mm or } \frac{\Delta C}{\varepsilon_s} = 1190 \text{ pF}/\varepsilon_m \quad (5)$$

Figure 1C:
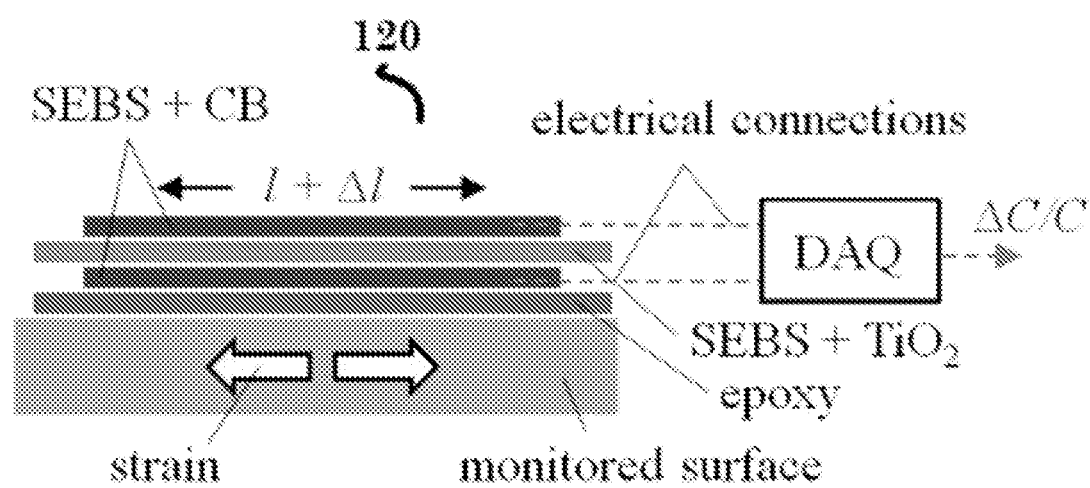
FIG. 1C shows a Measurement Principle of the current disclosure (layers not scaled).

Note that the sensitivity of each SEC may vary by ±20% due to the manual fabrication process. The sensing principle for the sensor consists of directly measuring the relative changes in capacitance of a SEC over time. FIG. 1C illustrates the measurement principle. The sensor is adhered onto the monitored surface using an epoxy. A strain on the monitored surface provokes a change in the sensor geometry $\Delta l$, which is measured by the data acquisition system (DAQ) as a change in the capacitance $\Delta C$, or the relative change $\Delta C/C$, where C is the nominal capacitance. FIG. 1C shows a measurement principle 120 of the current disclosure.

SEC Signal-Strain Model

Several models have been studied to describe the stress-strain relationship for thermoplastic elastomers, which is dominated by a nonlinear rate-dependent response. This nonlinear response is further complicated by additional nonlinearities from the hysteresis and Mullins' effect. A typical constitutive model used to represent the mechanical behavior is a three-parameters rheological model, in which an elastic spring and a visco-plastic dashpot in series are installed in parallel with a hyper-elastic rubbery spring. The three-parameter model has been used in civil engineering, for system identification of rubber bearings used for base-isolation. In the proposed application, we assume that the materials on which the polymer is bonded significantly stiffer than the SEC. For a two-dimensional bending beam subjected to low frequency excitations, one can write:

$$\varepsilon_s = \varepsilon_m = -c\frac{\delta^2 y}{\delta x^2} \quad (6)$$

Where $\varepsilon_m$ is the strain of the monitored beam surface, c is the distance from the surface to the centroid of the beam, y is the deflection (downwards in FIG. 1D), and x is the longitudinal Cartesian coordinate (leftwards in FIG. 1D). FIG. 1D shows a laboratory setup for four SECs: at (a): general setup with four SECs installed on the bottom of the beam 140; and at (b) setup schematic—from side 142; and (c) setup schematic 144—from under the beam. Using Eqs. (4) and (6), one obtains a gage factor independent of the nanoparticle mix:

$$\frac{\frac{\Delta C}{C}}{\varepsilon_m} = 2 \quad (7)$$

Shape Reconstruction

The problem of real-time reconstruction of deflection shapes from position and curvature measurements from sensor networks has been widely studied, with applications to condition assessment, SHM, and shape control. Here, we select the polynomial interpolation method for reconstructing the deflection shapes from a network of curvature data, a technique also used to smoothen data. The algorithm consists of fitting the curvature data using a polynomial function. In the case of a two-dimensional beam equipped with four sensors, the fitting function is taken as a third degree polynomial to avoid possible over-fitting.

$$\hat{\varepsilon}_{m,j} = a_0 + a_1 x_j + a_2 x_j^2 + a_3 x_j^3 \quad (8)$$

where the hat denotes an estimation for the $j^{th}$ sensor. Minimizing the error J for n sensors:

$$J = \sum_{j}^{n} (\varepsilon_{m,j} - \hat{\varepsilon}_{m,j})^2 \quad (9)$$

leads to the expression:

$$A = (X^T X)^{-1} X^T \Xi_m \quad (10)$$

with:

$$A = \begin{bmatrix} a_0 \\ a_1 \\ a_2 \\ a_3 \end{bmatrix}$$

$$\Xi_m = \begin{bmatrix} \varepsilon_{m,1} \\ \varepsilon_{m,2} \\ \ldots \\ \varepsilon_{m,n} \end{bmatrix} \quad (11)$$

$$X = \begin{bmatrix} 1 & x_1 & x_1^2 & x_1^3 \\ 1 & x_2 & x_2^2 & x_2^3 \\ \vdots & \vdots & \vdots & \vdots \\ 1 & x_n & x_n^2 & x_n^3 \end{bmatrix}$$

Once the parameters A are determined, the deflection shape is obtained by integrating the curvature twice:

$$y(x) = \int_0^L \int_0^L \frac{\delta^2 y}{\delta x^2} dx^2$$

$$\int_0^L \int_0^L -\frac{1}{c}(a_0 + a_1 x_j + a_2 x_j^2 + a_3 x_j^3) dx^2 \quad (12)$$

$$-\frac{1}{c}\left(a_0 \frac{x^2}{2} + a_1 \frac{x^3}{6} + a_2 \frac{x^4}{12} + a_3 \frac{x^5}{20}\right) + b_1 x + b_2$$

where L is the length of the beam. Enforcing the boundary conditions y(0)=y(L)=0 for a simply-supported beam, one obtains:

$$b_1 = \frac{1}{c}\left(a_0 \frac{L}{2} + a_1 \frac{L^2}{6} + a_2 \frac{L^3}{12} + a_3 \frac{L^4}{20}\right) \quad (13)$$

$$b_2 = 0$$

Experimental Setup

In this section, the proposed sensor network is validated using 1) a single SEC; and 2) four SECs organized in a network, both measuring surface strain of a bending beam. An additional test is conducted on a free-standing sensor to study its behavior under large levels of strain (0-20%). We use the same SEC sensor size as shown in FIG. 1A to characterize the performance of a full-scale sensor. Bending beam tests are conducted in a three-point load setup on a simply supported aluminum beam of support-to-support dimensions 406.4×101.6×6.35 mm$^3$ (16×4×0.25 in$^3$). A typical experimental setup is shown in FIG. 1D. SECs and RSGs are installed following a similar procedure. The monitored surface is sanded, painted with a primer, and a thin layer of an off-the-shelf epoxy (JB Kwik) is applied on which the sensors are adhered.

In the single SEC bending tests, the SEC and strain gage are located under the beam at x=0.50 L. For the four SECs tests, the SECs and strain gages are located under the beam at x={0.20, 0.40, 0.60, 0.80}L, as shown in FIG. 1D at (b) and (c). The load is applied using a hand operated hydraulic test system (Enerpac) for the static tests, and a servo-hydraulic fatigue testing machine (MTS) for quasi-static tests. All tests are repeated three times. In the free-standing tests, the sensor is pre-stretched at approximately 1.5% strain and subjected to a uniaxial tensile strain using an Instron universal testing machine (model 5569).

Data from the SECs are acquired using an inexpensive off-the-shelf data acquisition system (ACAM PCap01) sampled at 95.4 Hz for the single SEC setup (including the free-standing setup), and 48.0 Hz for the four SECs setup. The SEC readings are compared against RSG with resolution of 1µε (Vishay Micro-Measurements, CEA-06-500UW-120). Strain gage data are acquired using a Hewlett-Packard 3852 data acquisition system, and data sampled at 1.7 Hz when using the hand hydraulic, and 55 Hz when using the MTS. Data are filtered using a low-pass filter, and zeroed using the average capacitance while the beam is unloaded.

Validation of the SEC

Figure 1E:
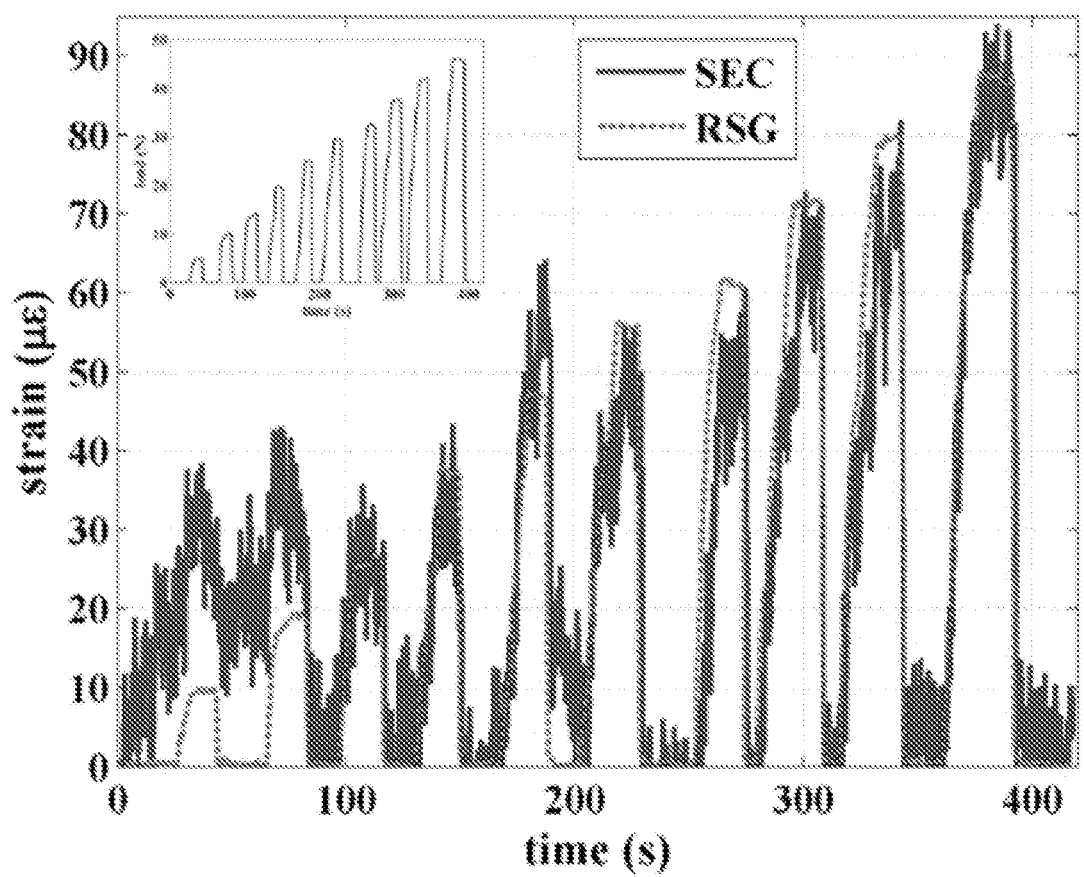
FIG. 1E shows strain history of SEC versus RSG (step load).
Figure 1F:
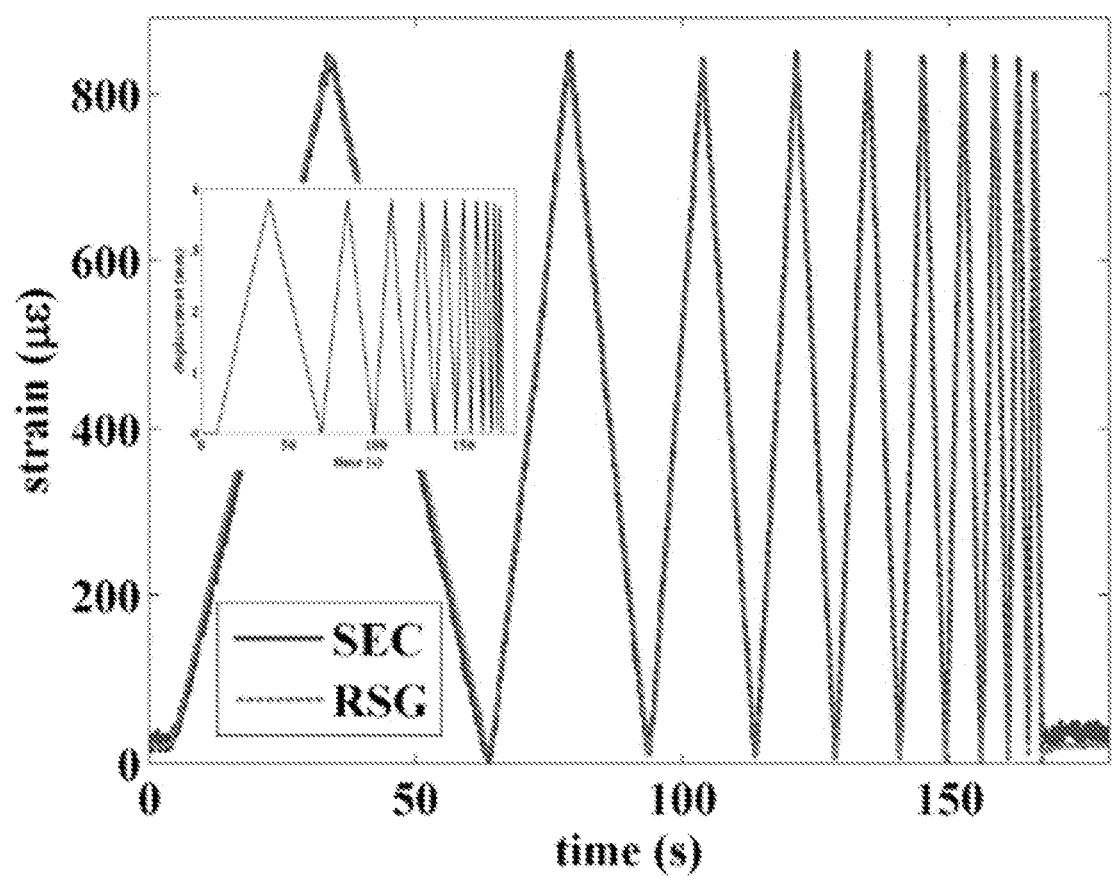
FIG. 1F shows strain history of SEC versus RSG (triangular load) and actuator displacement.
Figure 1G:
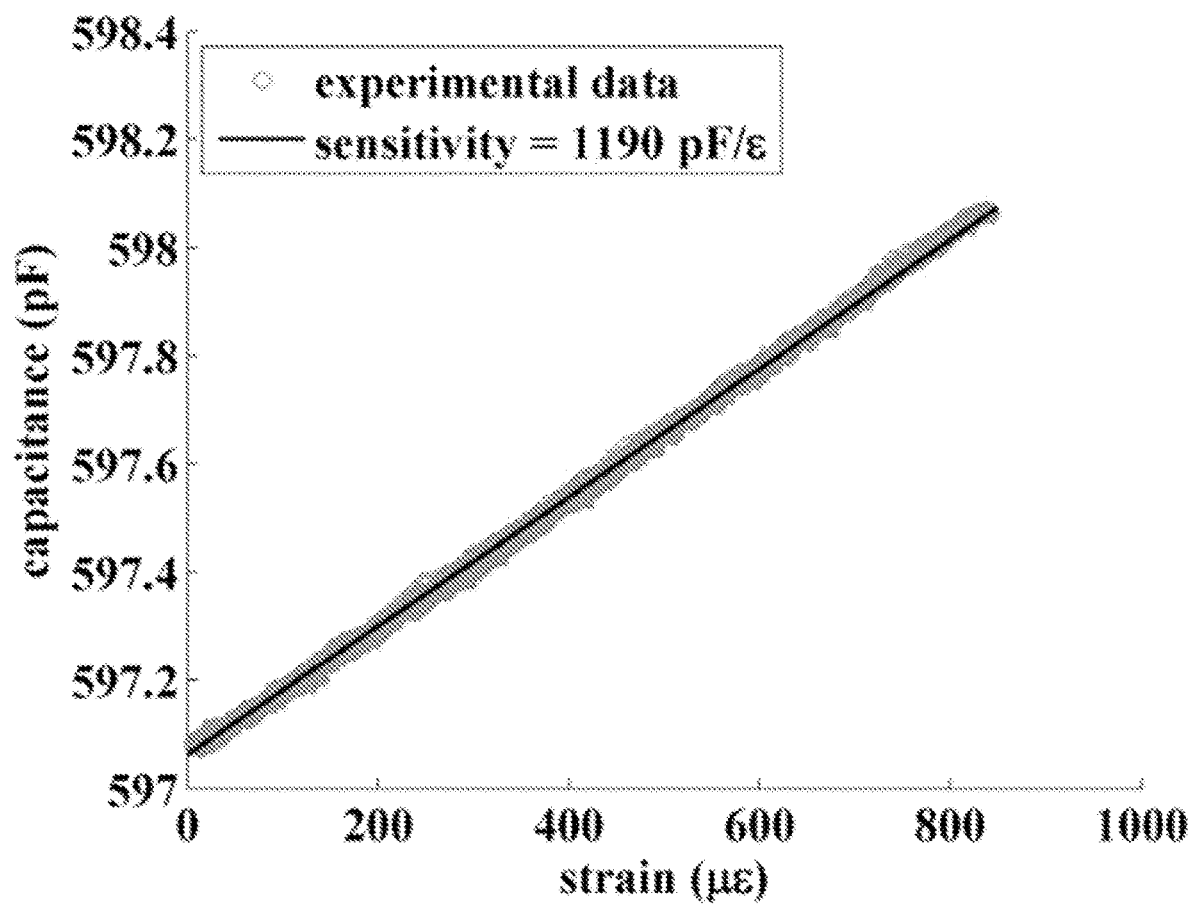
FIG. 1G shows sensitivity of the SEC.

A single SEC is first validated using a step load. FIG. 1E is a plot of the results, in which the capacitance signal has been transformed into strain using Eq. (7). The SEC signal raises above noise beyond 25µε, but for strain levels above 55µε, there is a constant difference of approximately 8µε. FIG. 1F shows the results from a typical quasi-static load test. The excitation history consists of a displacement-based triangular wave loads with increasing frequencies from 0.0167 to 0.40. Results show that the SEC is capable of tracking a quasi-static strain history within a given level of resolution. FIG. 1G is a plot of the SEC readings in function of the strain measured by the RSG, validating the linearity of the sensor. Its measured sensitivity is in agreement with Eq. (5). Given that the dielectric permittivity does not change significantly in the low frequency range (<100 Hz), a large portion of the measurement errors in both FIGS. FIGS. 1E and 1F can be attributed to the electronics. Firstly, there is parasitic capacitance in the cables connecting to the sensors, which cause variations in the measured capacitance. Because SECs require very small power, this noise can be minimized by digitizing the signal at the source, enabling long distance transmissions, either over a wired or wire-less link, with essentially no signal degradation. Secondly, the DAQ itself may not have the sufficient resolution for measuring small changes in capacitance. For instance, using Eq. (5), the measurement of 1µε over the SEC corresponds to measuring a change of 0.00140 pF.

Figure 1H:
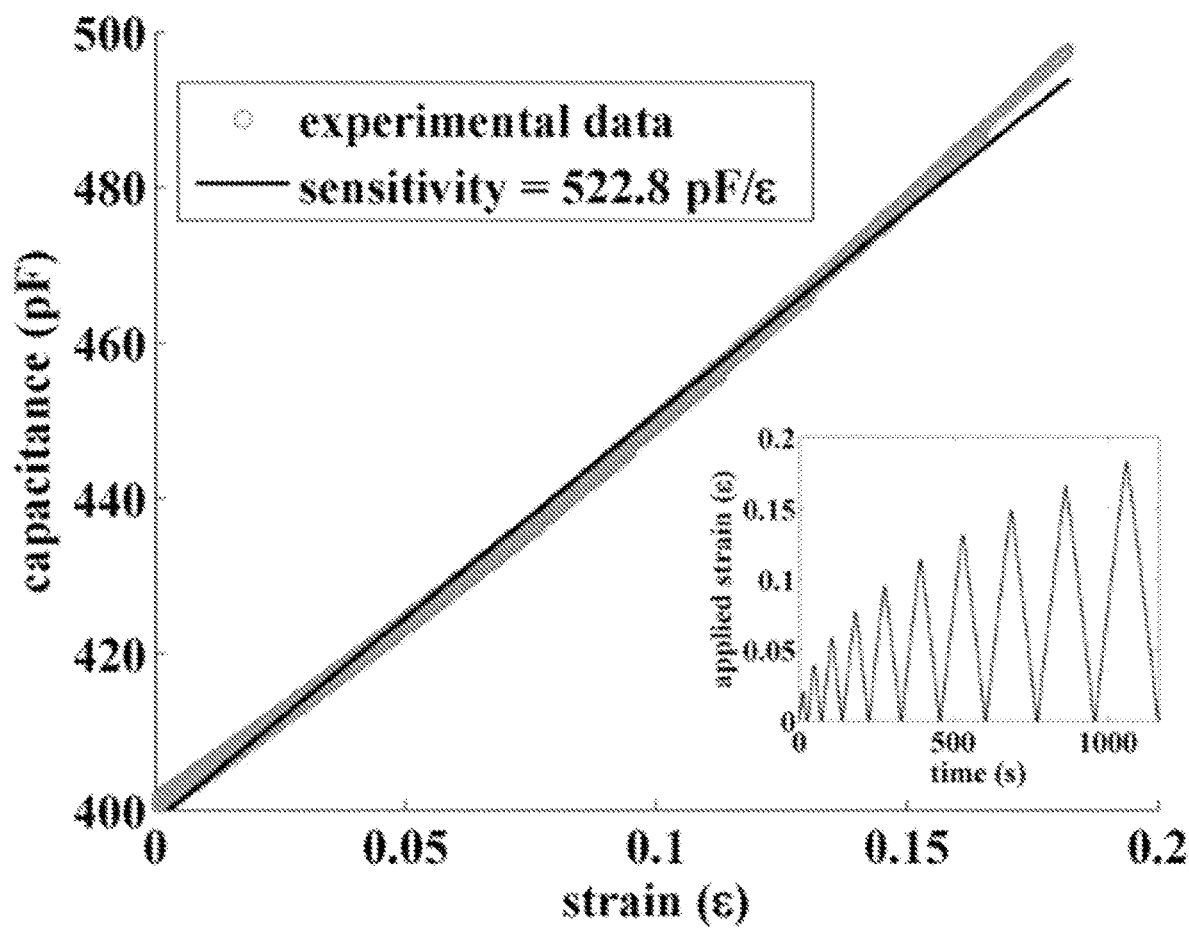
FIG. 1H shows sensitivity of the SEC under large strain levels.

Thirdly, there is a small linear drift in the signal. This drift can be seen in both FIGS. 1E and 1F, where the SEC signal does not return to the zero strain line. While this drift could be filtered out, future developments in dedicated DAQ systems for SEC measurements may minimize this noise. Other sources of error may come from imperfections in the sensor fabrication and geometry, and/or a slight angle in the application of the sensor, which would change the geometric relationship described in Eq. (2). A net advantage of the SEC is its high elasticity compared to conventional strain transducers, enabling measurements of large strain levels. To study the behavior of the SEC at large strains, the sensor is subjected to a triangular strain ramping from 0 to 20% in approximately 2% increments. FIG. 1H shows a plot of the measured capacitance versus applied strain after pre-stretch, along with the applied strain history. Results show that the sensor exhibits a slight nonlinearity over the range 0-20%. Note that, in a free-standing setup, the sensitivity cannot be obtained using Eq. (5), because cy does not equal 0. Also, the differential form of Eq. (1) given by Eq. (2) does not apply for large strain, which explains the loss in linearity compared to FIG. 1G. Nevertheless, it is possible to model the nonlinear sensitivity of the sensor for large strain measurements.

Shape Detection Using Sensor Network

Figure 1I:
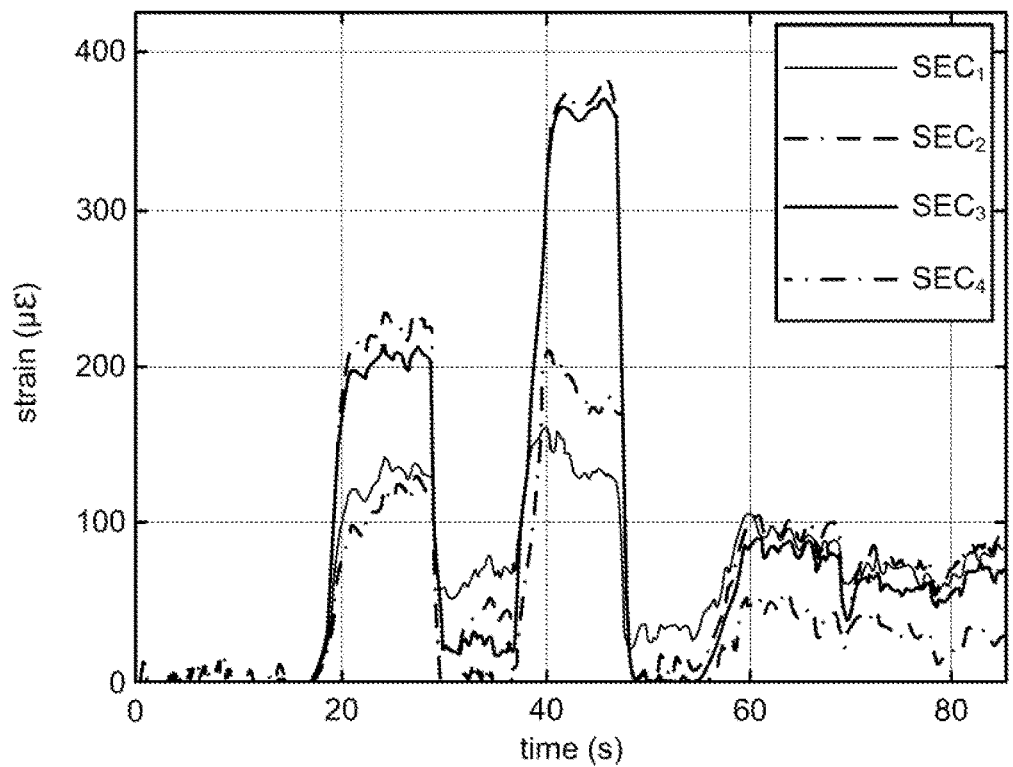
FIG. 1I shows strain history for four SECs: (a) SECs; and (b) RSGs.
Figure 1I:
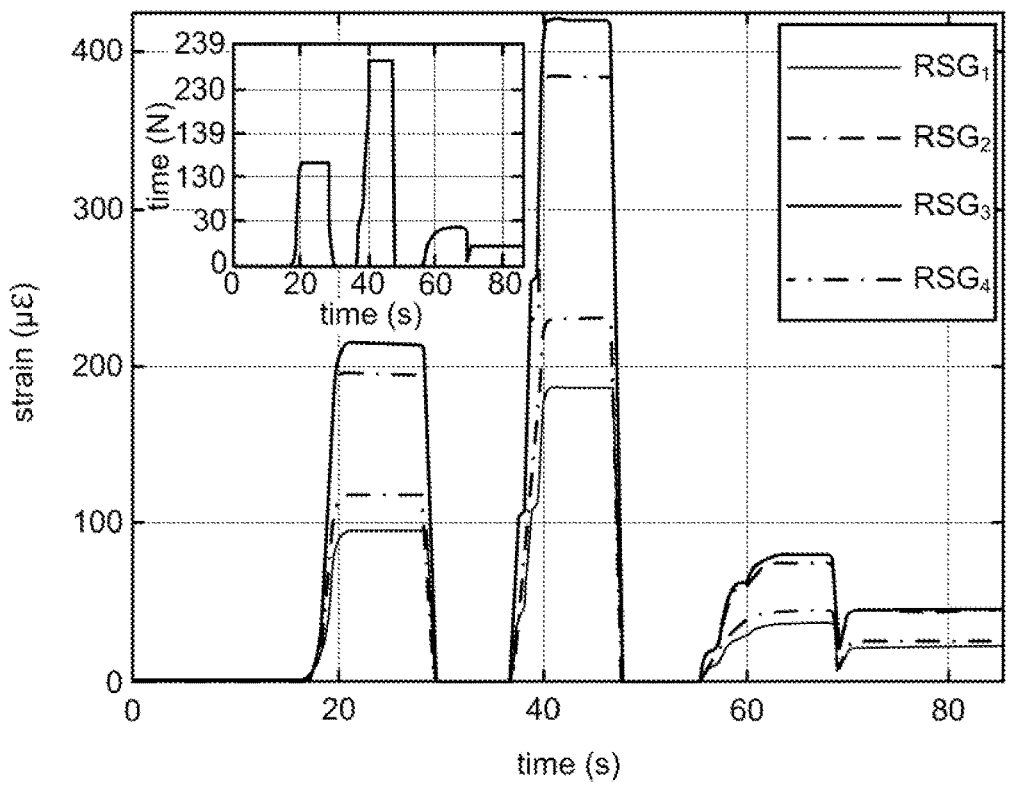

This subsection demonstrates a SHM application using a network of SECs. Strain measurements from four SECs are used to reconstruct the deflection shapes using the representation from Eq. (12). Note that the double integration of strain data to reconstruct the deflection shape may cause an accumulation of errors. This effect is minimized by the utilization of the polynomial fit that inherently filters the strain data, and by the enforcement of the boundary conditions (y(0)=y(L)=0). In implementations, it would be also possible to further reduce the error, for instance, by averaging the resulting shapes within small periods of time, depending on the sampling rate. FIG. 1I shows the strain time history of the four SECs subjected to a static load. The comparison of results between FIG. 1I at (a) and (b) show that the results from the SECs agree with the RSGs at low levels of strain (<100με), but the discrepancy increases with the level of strain, reaching up to 100με. Note that the small difference between symmetric strain gages ($RSG_1$ versus $RSG_4$ and $RSG_2$ versus $RSG_3$) can be explained by a slight off-centered installation of sensors and/or application of the load.

Figure 1J:
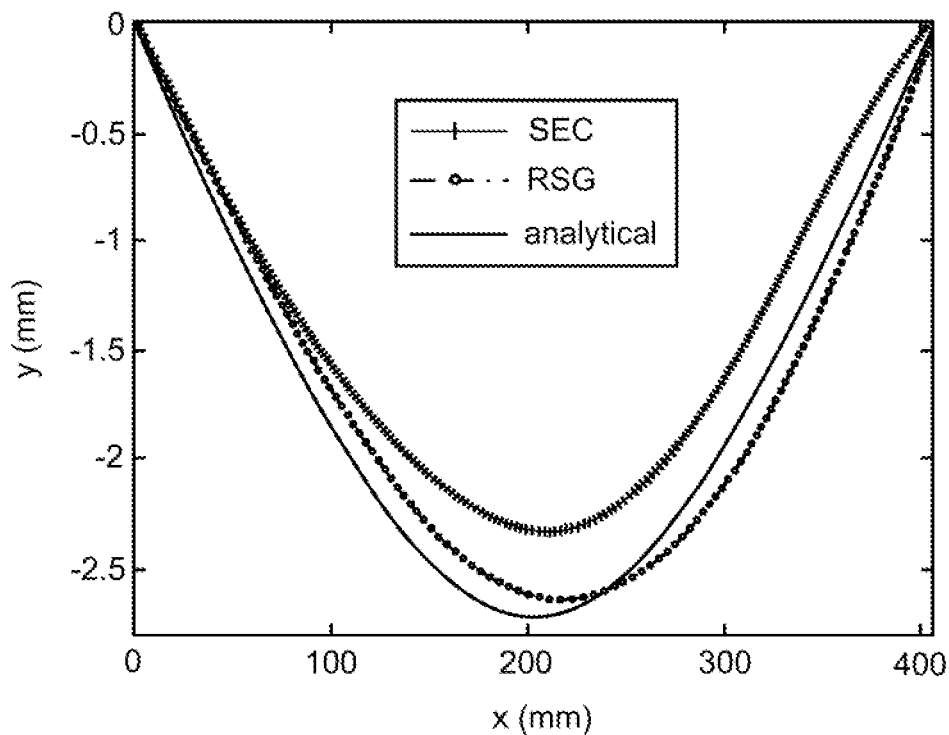
FIG. 1J shows deflection shapes: (a) Non-normalized; and (b) normalized.
Figure 1J:
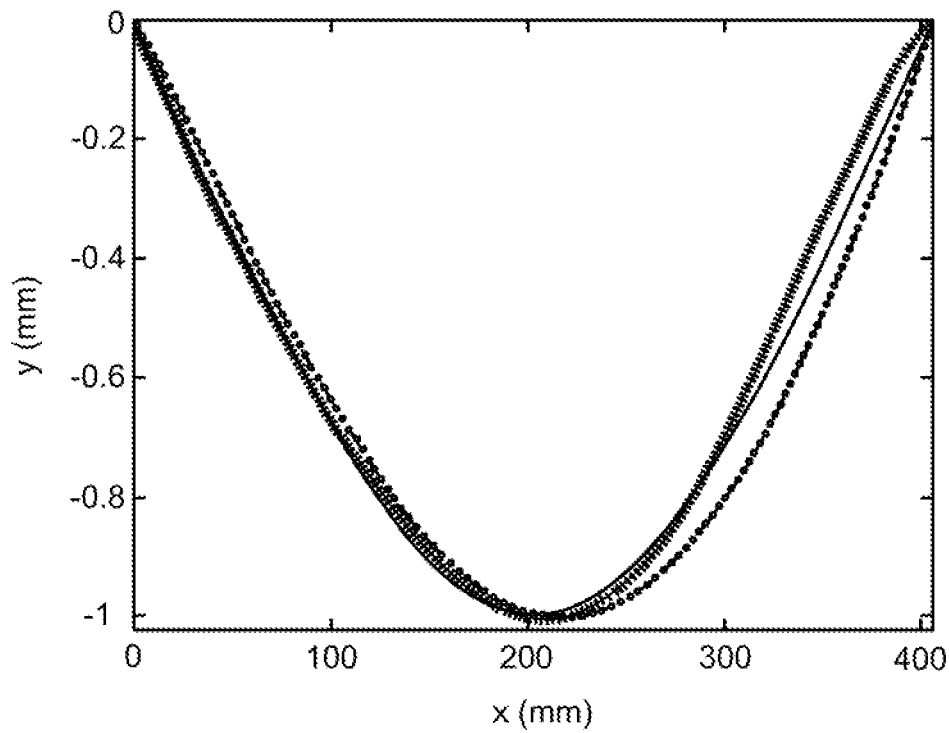
Figure 1K:
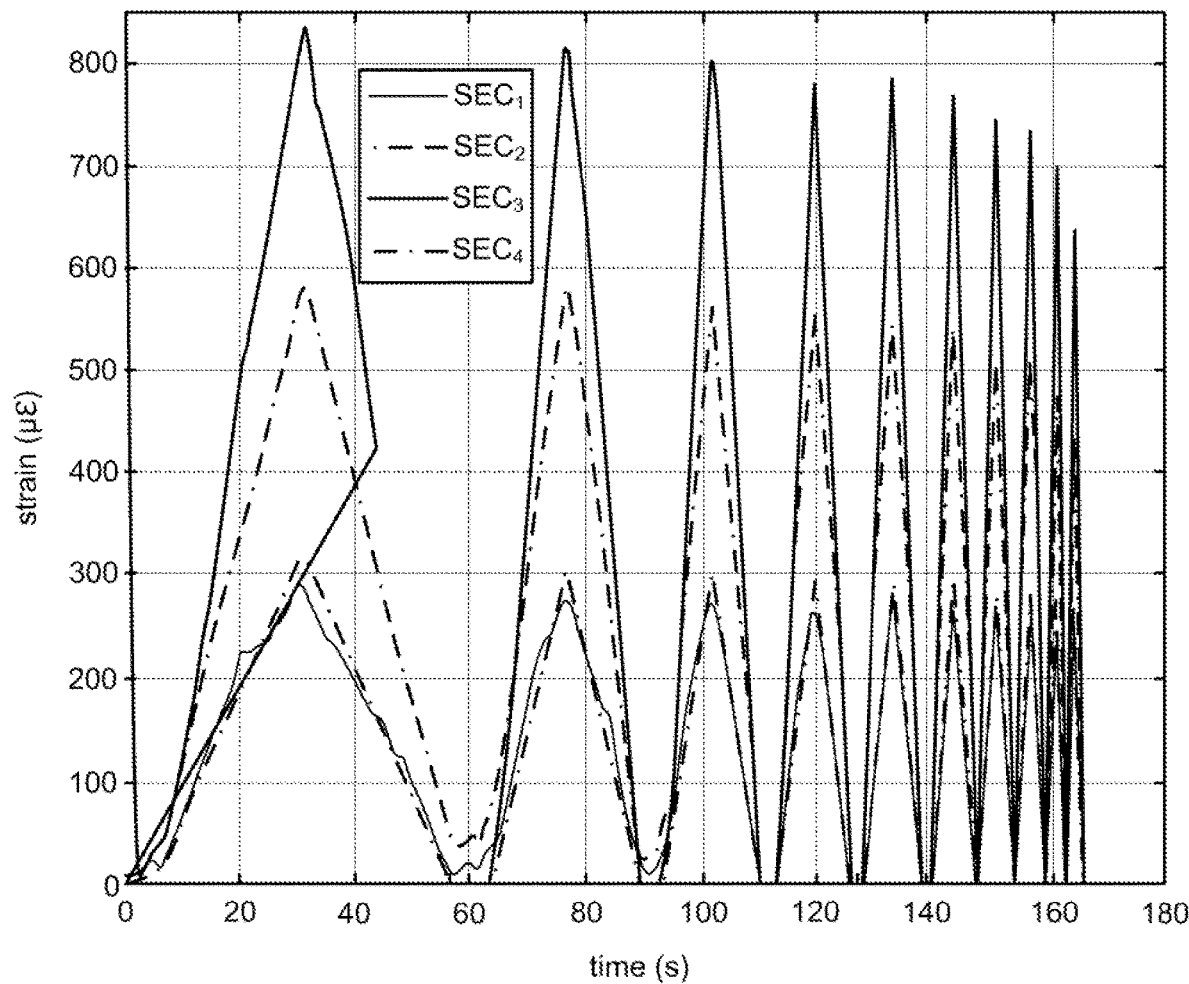
FIG. 1K shows strain history for four SECs: (a) SECs; and (b) RSGs and actuator displacement.
Figure 1K:
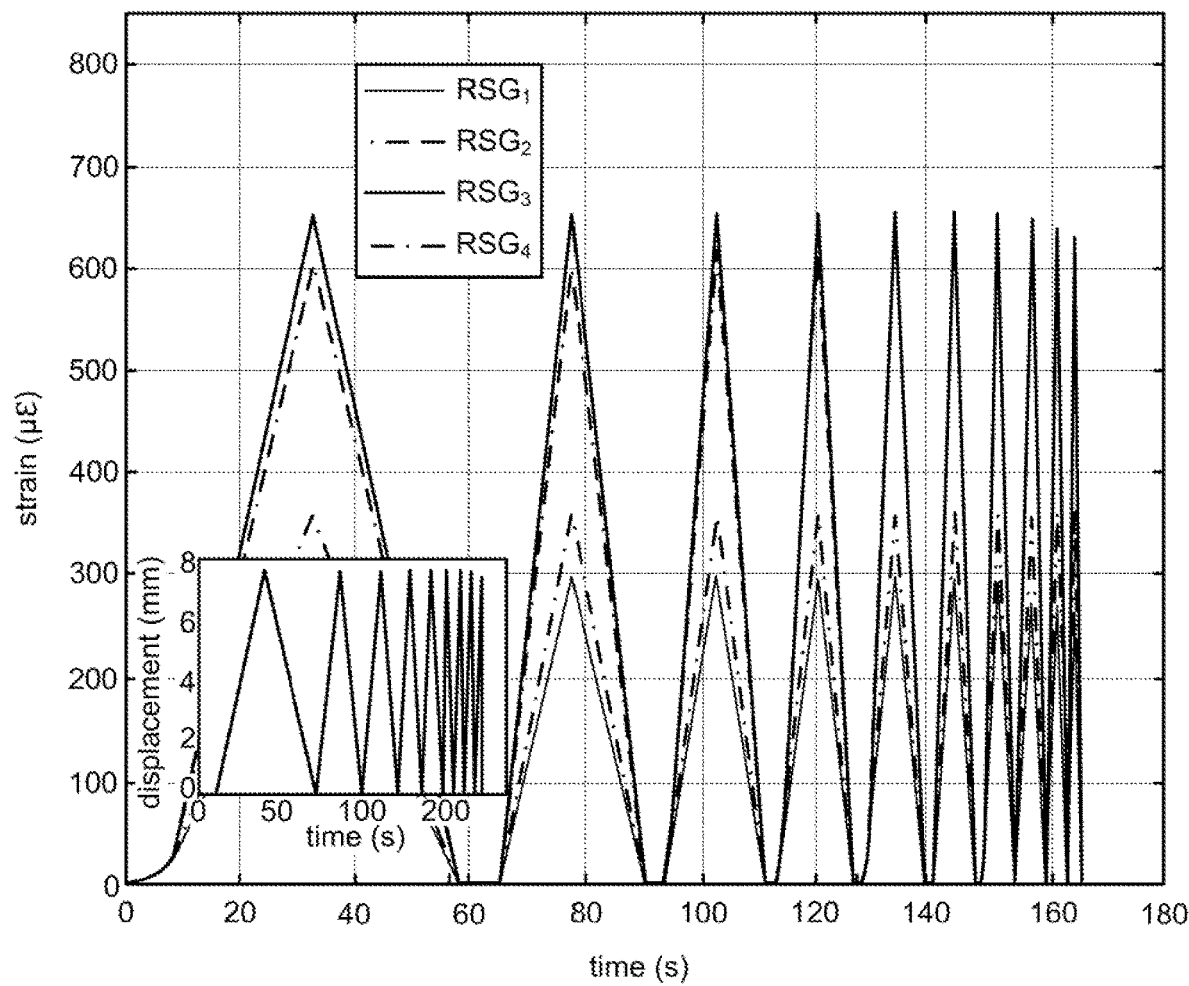

Using the surface strain data for FIG. 1I, the deflection shapes are estimated and shown in FIG. 1J for a typical result (at time t=25 s). The shape obtained from the SECs is compared against the shape obtained from the RSGs using the same procedure as described herein. Results are compared against the analytical solution using Euler-Bernoulli beam theory:

$$y(x) = -\frac{Px}{48EI}(3L^2 - 4x^2) \text{ for } 0 \le x \le \frac{L}{2} \quad (14)$$

where y(x) is symmetry about L/2, P=120 N is the applied load at time t=25 s, and E and I are the Young's modulus and moment of inertia of the beam, respectively. FIG. 1J at (a) compares the non-normalized results. The underestimation of strain for the SECs clearly results in an underestimation of the magnitude of the shape. In applications to SHM, the normalized deflection shape might be more informative to detect damages or changes in the structural behaviors. FIG. 1J at (b) shows the shapes normalized to a maximum deflection of −1. Results from the SECs compare well against RSGs and the analytical solution. The average root-mean-square (RMS) error of the normalized deflection shapes for the duration of the load P=118 N (for 20.6 s≤t≤28.8 s) is 0.208 mm/mm for the SECs and 0.376 mm/mm for the RSGs, showing a comparable, yet improved, normalized shape. Taken over the entire length of the test, the average RMS errors augment to 1.32 mm/mm and 3.50 mm/mm for the SECs and RSGs, respectively. This increase is due to the larger errors at the unloaded conditions, during which the polynomial reconstruction gives inaccurate results. Lastly, we subject the specimen to the triangular load (displacement-based) with increasing rate described herein. The strain time histories for the SECs and RSGs, and the actuator displacement history are shown in FIG. 1K.

Figure 1L:
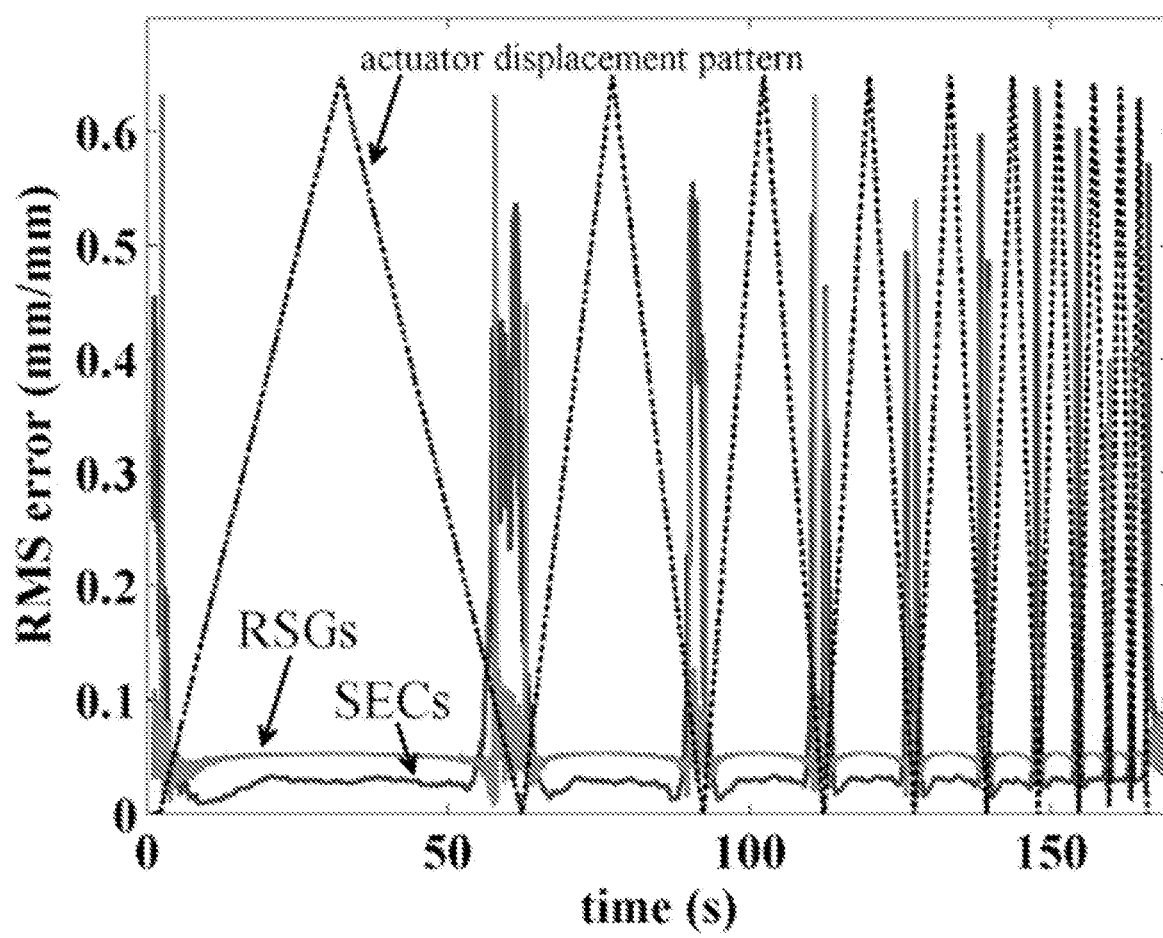
FIG. 1L shows RMS error of the normalized deflection shapes with respect to the analytical solution.

Results show that the SECs are capable of tracking the strain history, but that the SECs increasingly underestimate strain with increasing strain magnitude, except for $SEC_3$ which is overestimating strain. Another feature is that $SEC_2$ is showing an important difference with respect to $SEC_3$ in the measurements, a difference minimized between $RSG_2$ and $RSG_3$. Note that this difference should theoretically be zero if the sensors are placed symmetrically. This difference was not observed in the triangular load test, see FIG. 1I. As discussed above, a small offset in the installation can explain the difference between $RSG_2$ and $RSG_3$. FIG. 1L compares the root mean square (RMS) error of the normalized deflection shapes with respect to the analytical solution. The SEC network obtains a more accurate shape than the RSG network beyond an initial level of loading. Here as well, when the beam is unloaded, the noise in the sensors signals results in inaccurate deflection shapes. The significant difference in performance between both sensors can be attributed to the SECs averaging strain over a large area, while the RSGs measure a localized strain. SECs are less sensitive to placement errors.

We have presented a sensor network developed for strain sensing over large surfaces. The network consists of SECs arranged in an array form, transducing strain into changes in capacitance. These elastomeric sensors are fabricated in-laboratory using solutions of SEBS+$TiO_2$ for the dielectric and SEBS+CB for the compliant electrodes. Results from the experimental validation demonstrated that the sensor compares well against off-the-shelf resistive strain gages. Given the relative size of a single SEC compares with a RSG, it follows that the sensor can be used as a surface strain gage capable of covering large areas. It was also shown that the sensor can measure large strains, in the levels of 0-20%. The installation procedure used for the laboratory experiments consisted of a hand-installation using an off-the-shelf epoxy. This demonstrates the easy applicability of the sensing solution. Further, sensors may be integrated into structures such as tires, either embedded internally or applied externally to achieve the results described herein.

Results also show the sensor has a tendency to underestimate strain. The underestimation of strain can be due to parasitic capacitance from the wires, complexity in measuring low changes in capacitance using off-the-shelf DAQ, drift in the signal, impurities in the sensor fabrication, and/or inconsistencies during the manual installation. We envision the development of dedicated data acquisition systems for measuring differential capacitance, which would increase the resolution of the sensor at levels comparable to conventional strain gages. This underestimation of strain limits the capability of extracting accurate physics-based features associated with non-normalized displacement values.

The SEC sensor network has been demonstrated in a four SECs setup to detect deflection shapes of a simply supported beam. The deflection shapes have been reconstructed using a simple polynomial algorithm. Results have shown that the SECs were underestimating the real shape, consistent with results discussed above, but were estimating the normalized deflection shapes accurately. Comparisons with RSGs showed that the SECs were estimating the normalized shapes with less error. This good performance can be explained partly by the capacity of the SECs to average strain over a large area, unlike RSGs that measure localized strain. This particularity represents a strong advantage of SECs over RSGs.

The proposed sensor network is a promising tool for conducting SHM at the mesoscale. In a network setup, the network could be used to collect two-dimension strain data, from which physics-based features can be extracted, including over-stresses, torsion, utilization history, etc. These features can subsequently be utilized as input to forecast models to conduct structural diagnostic and prognostic. Possible applications other than extraction of deflection shapes include crack detection and localization on concrete structures, detection of permanent deformations on steel members, and weigh-in-motion sensing.

Herein, the SECs of the present disclosure are composed of thin flexible dielectrics, coated on both sides with electrodes. As the SECs stretch, the electrodes get closer together and the change in capacitance is measured. Algorithms analyze these changes and create models that show the deformation of the tire.

Figure 2:
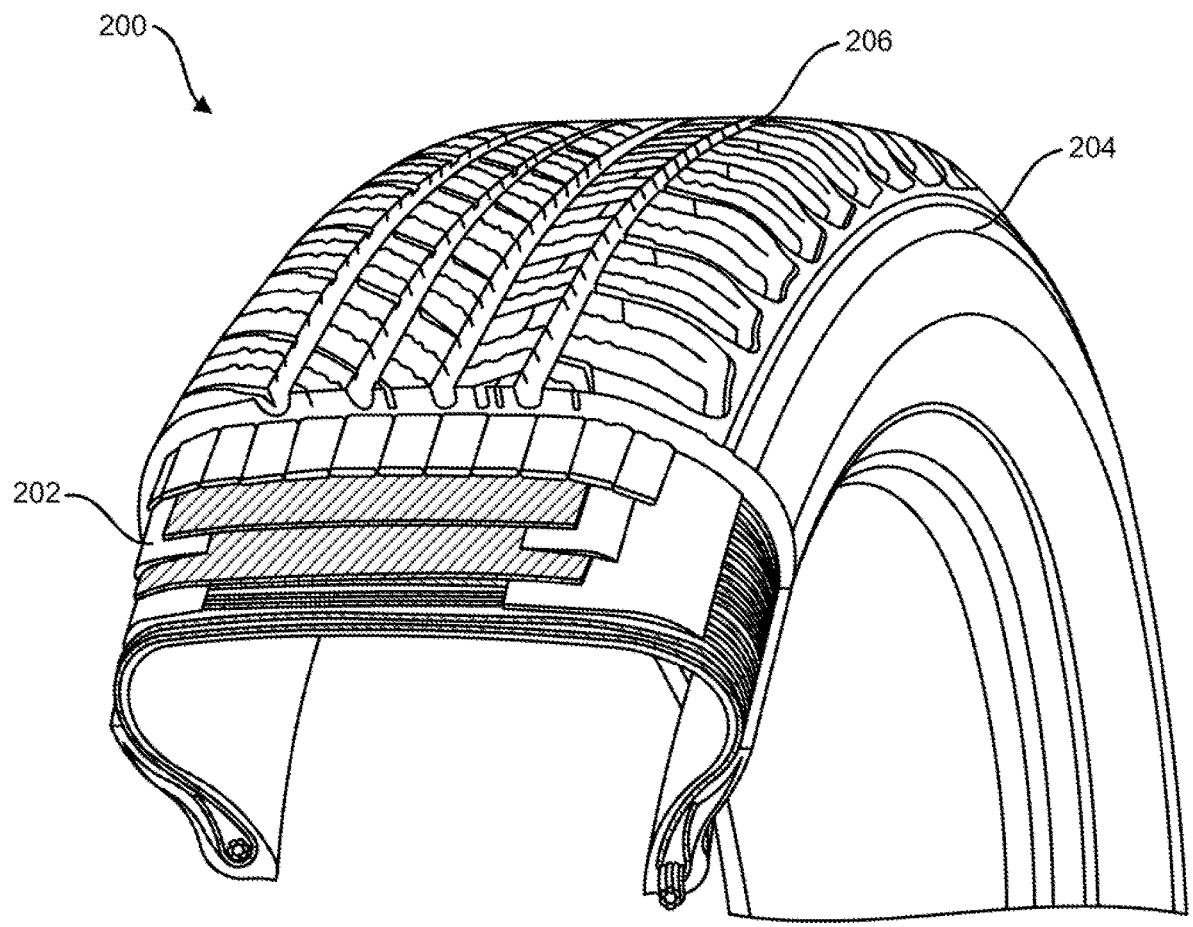
FIG. 2 shows a cross section of an automobile tire.

FIG. 2 shows a cross section 200 of an automobile tire. Sensors of the current disclosure may be inserted internally into a tire, such as shown via 202 between fabrication layers or on the side wall 204 or running surface 206 of the tire.

Figure 3:
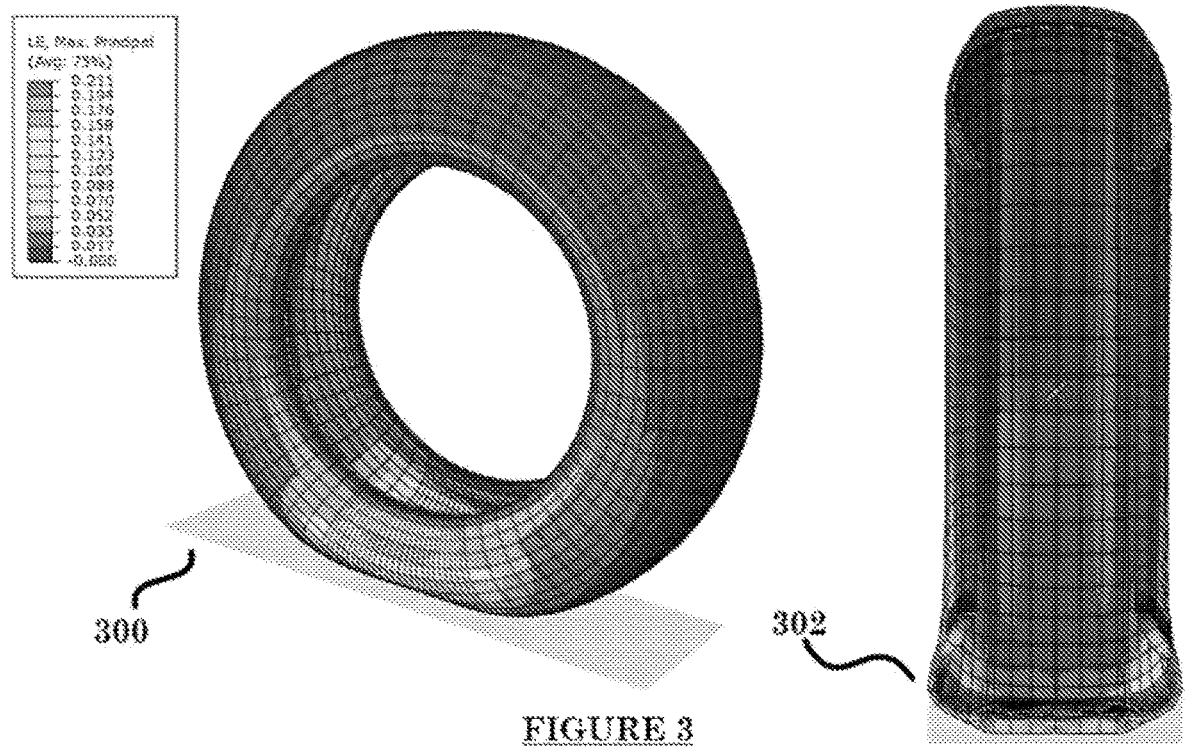
FIG. 3 shows an illustration of tire deformation.

FIG. 3 shows an illustration of tire deformation 300. The behavior of elastomeric materials is controlled by the inherent nonlinear viscoelasticity. The nonlinear behavior makes the material strain-rate dependent and lose energy during cyclic loading (hysteresis). These behaviors are important for many applications, for example when determining the footprint of a tire. In one embodiment, on may use the Bergstrom-Boyce (BB) model in PolyUMod® to determine the footprint of an inflated tire that is vertically loaded. The BB model can be used to determine the change in contact area, and the stress and strain distributions as a function of time. The PolyUMod library, originally developed by Veryst, is now available on PolymerFEM.com. Tire deformation 302 may be used to determine how a tire interacts with a road surface in order to determine and calculate rolling resistance.

The system may also include/work with an integrated roadway, such as a the modular system developed by Integrated Roadways. The integrated roadway may be made from a precast concrete section with dowels to form a Jointed Reinforced Concrete Pavement (JRCP). JRCP uses contraction joints and reinforcing steel to control cracking. Transverse joint spacing is longer than that for JPCP and typically ranges from about 7.6 m (25 ft.) to 15.2 m (50 ft.). Temperature and moisture stresses are expected to cause cracking between joints, hence, reinforcing steel or a steel mesh is used to hold these cracks tightly together. Dowel bars are typically used at transverse joints to assist in load transfer while the reinforcing steel/wire mesh assists in load transfer across cracks.

Figure 4:
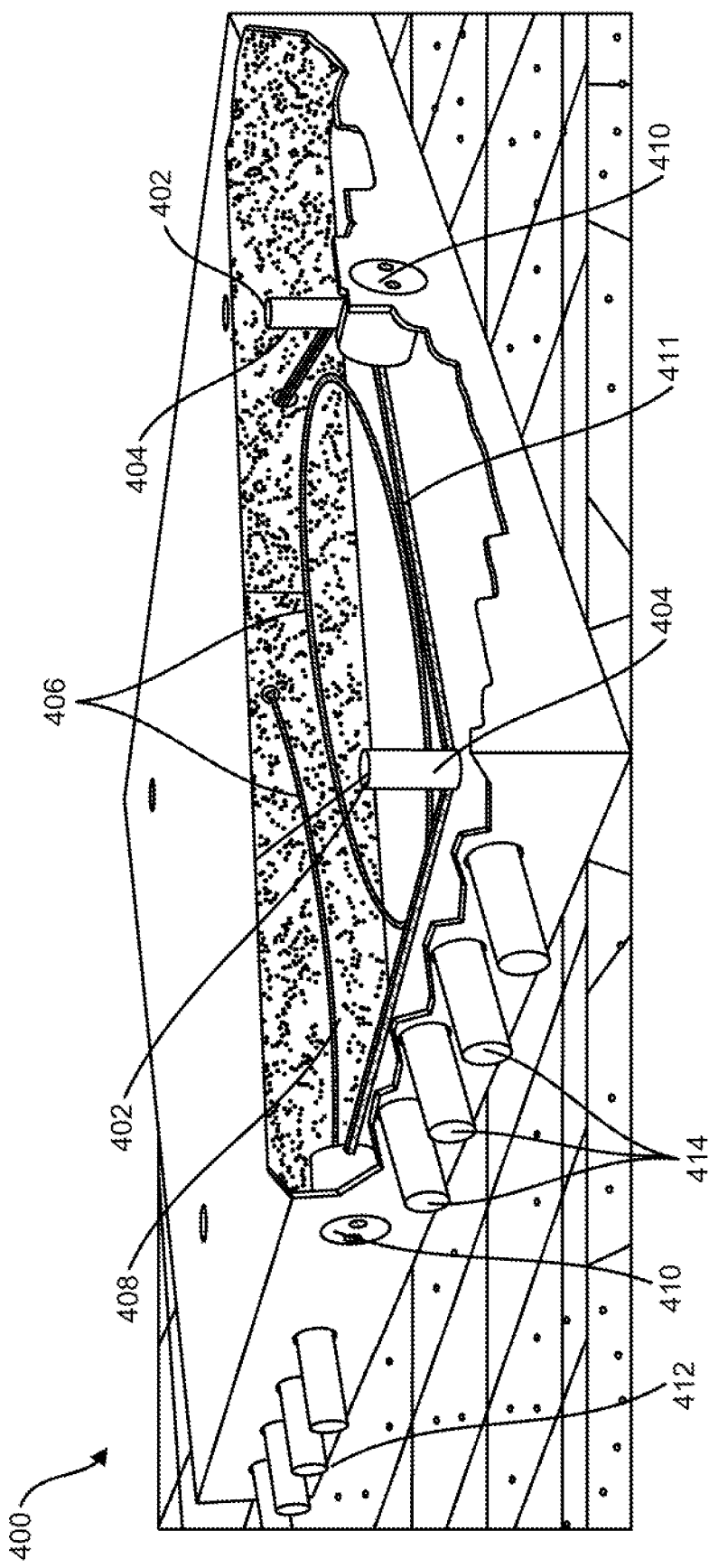
FIG. 4 shows a cutaway view of a section of an integrated roadway system.
Figure 5:
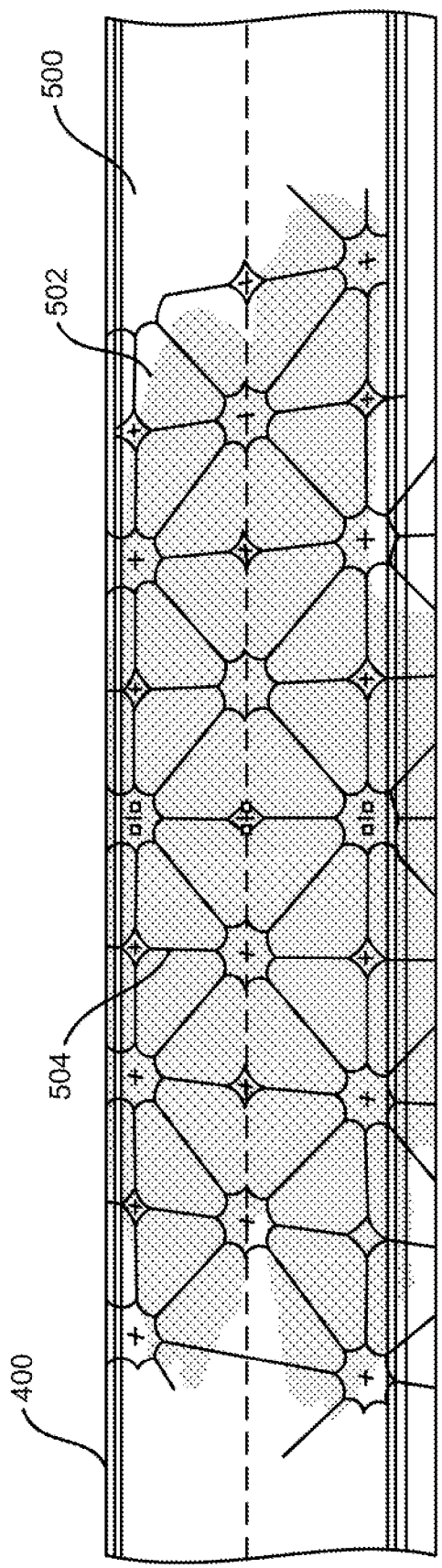
FIG. 5 shows an example of another embodiment of an integrated roadway.

FIG. 4 shows an example of integrated roadway section 400. The section may include access ports 402. Access ports 402 may be a Combined Access Port (CAP) that may be used to lift and position the section of integrated roadway slab into place. Once positioned, void with interior connector accommodates a sensor cylinder 404, which may contain processors, antennae and other technology installed within sensor cylinder 404, while remaining easily accessible for replacement or upgrade. Integrated roadway section 400 may also include a digitizer layer/vehicle detection loop 406, wherein a fiber optic strain mesh 408 is laminated to the slab's reinforcement. This is similar to a touch screen element and can identify tire positions rather than finger positions. Integrated roadway section 400 may also include at least one router 410 connected to neighbor sections of integrated roadway section 400 via wiring, fiber optics, Wi-Fi, etc., shown as 411, and may send information to a data center alongside the highway, not shown, containing integrated roadway section 400. Integrated roadway section 400 may also include a dowel and conduit system 412. Dowel and conduit system 412 may comprise a series of dowels 414 extending into adjacent conduits, not shown, then filled with grout, or another suitable mixture as known to those of skill in the art, to form a solid connection. Much like the touchscreen on a smartphone or tablet, sensors in integrated roadway section 400 can "feel" the positions, weights and velocity of every vehicle on the road, providing superior navigation and telemetry. This may even be used for Level 4 autonomous vehicles and capturing valuable traffic and usage data. Further, integrated roadway section 400 is completely upgradable, making it easy to add new features. Further, each slab is easily removable for repair or to access underlying utilities for service. Integrated roadway section 400 may also incorporate axis accelerometers 416 that measures vibrations in addition to sensing fiber optic cable 408 that measures strain in concrete. Further sensors may include a magnetometer to measure axle width to determine car type, a gyroscope to determine the actual position of the concrete slab. This data may run through power over an Ethernet connection to control centers. As FIG. 5 shows, integrated roadway section 400 may be further upgraded to provide features like snow and ice 500 melt functionality 502 and wireless charging 504 for electric vehicles.

Figure 6:
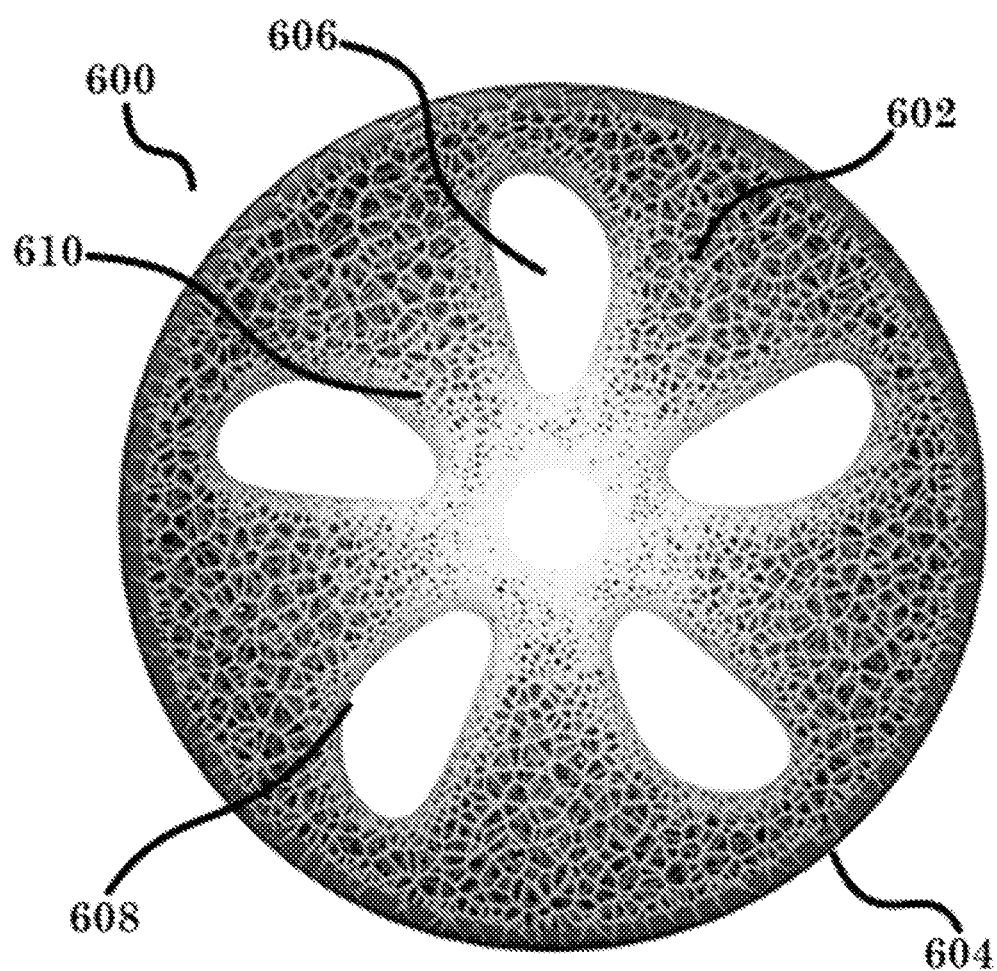
FIG. 6 shows an example of a 3-D printed tire with biodegradable tread and an airless honeycomb structure.

FIG. 6 shows an example of a 3D printed biodegradable tire 600 with airless support structure 602, which is shown as a "honeycomb" or open cell/vessel formation. While shown as such, other variations are herein considered disclosed, such as open cell/closed cell hybrids, "tunnels", etc. Tire 600 may be formed via 3-D printing with printed tread 604 on the tire rather than formed via attachment of a separate layer having preformed tread. Various polymers, including but not limited to biodegradable polymers, may be used to form tire 600. Openings 606 lessen weight as well and may be shaped to improve aerodynamics, air flow, lessens friction etc., with shapes such as wedge, "clover leaf," spirals, etc., with the shapes being uniform with respect to an outer facing shape 608 and maintaining this shape throughout depth 610 of tire 600 or the shape may change as the opening moves/penetrates from outer facing shape 608 into depth 610 of tire 600. 3-D printing would do away with the current practice of forming tires from layers affixed to another via adhesives, vulcanization, melt-formed, etc., and would allow for great product control as the tire is "deposited" and formed in a single step.

Tire 600 may be used with the SECs and integrated roadway technology to determine the conditions for the tread depending on the route traveled. Bridgestone airless tire technology features a unique spoke structure designed to support the weight of a vehicle, effectively eliminating the need to periodically refill the tires with air. Tire 600 may be an air free concept non-pneumatic tire featuring improved load-bearing capabilities, environmental design and driving performance. Currently, most airless tires on the market are made from solid rubber or plastic. Golf carts, trailers and lawnmowers are a few examples of these tires being used in commercial applications. Airless tires have numerous benefits, including no flat tires, never having to worry about tires leaking because as non-pneumatic tires have no air to leak, no need to carry a spare tire, freeing up trunk space, lessening vehicle weight thereby increasing fuel economy. Further, loss of time due to tire failure would also be significantly reduced.

As about 90% of energy loss from tire rolling resistance comes from repeated changes in the shape of the tries as they roll. By simplifying the structure of the tire, this will minimize the energy loss in "air free tires." As a result, these tires have the same level of low rolling resistance as fuel efficient tires, such as the Ecopia tires from BRIDGESTONE, contributing to reductions in $CO_2$ emissions.

The vast majority of airless designs follow a similar theme. An outer ring is fitted with a rubber tread, which connects to the hub with a series of polymer spokes. The weight of the vehicle hangs from the top of the ring, placing the spokes in tension. BRIDGESTONE and SUMITOMO have both displayed prototype designs. MICHELIN recently announced its new Uptis design, which has a chevron shape to the spokes. One of the main benefits is lateral stability. In standard radial tires, it's not possible to improve lateral stiffness without affecting other properties of the tire. Stiffening the tire in this way can lead to the tire offering a harsh ride, particularly over bumpy surfaces. However, due to the construction of the airless designs, the tire can be made to be forgiving in the vertical axis, while being stiff from side-to-side. This has the benefit of making handling far more sharp, which is of particular interest for sporting and high-performance applications.

The contact patch of an airless tire is another point of interest. Unlike air-filled tires, which by necessity bulge out at the sides with air pressure, the contact patch of an airless tire can be far more consistent and flat. By having no air, it no longer rests on the driver's shoulders to ensure their tires are sitting at the correct pressure to maintain the proper contact patch.

Another boon of the technology is wear. Despite tire pressure monitors now being widespread, and manufacturers trying to educate drivers about proper tire rotation practices, very few consumers take good care of their tires. Running under or overinflated can prematurely wear a set of tires, but with airless design, this isn't an issue. Additionally, manufacturers claim that it should be possible to easily and safely replace the tread on such designs, with little to no degradation in performance. This would have huge sustainability ramifications; current estimates are that 1.5 billion tires are discarded each year. Any improvements in the recyclability of tire components could have a major impact.

Having an airless design brings the possibility of perforating the tire to create channels for water to flow away. By no longer requiring the water to be pushed out from under the tire. Developments in this area could greatly reduce the chance of aquaplaning when driving through standing water. Since aquaplaning can lead to total loss of control of a vehicle, any improvements in this space have the potential to save money and lives.

Figure 7:
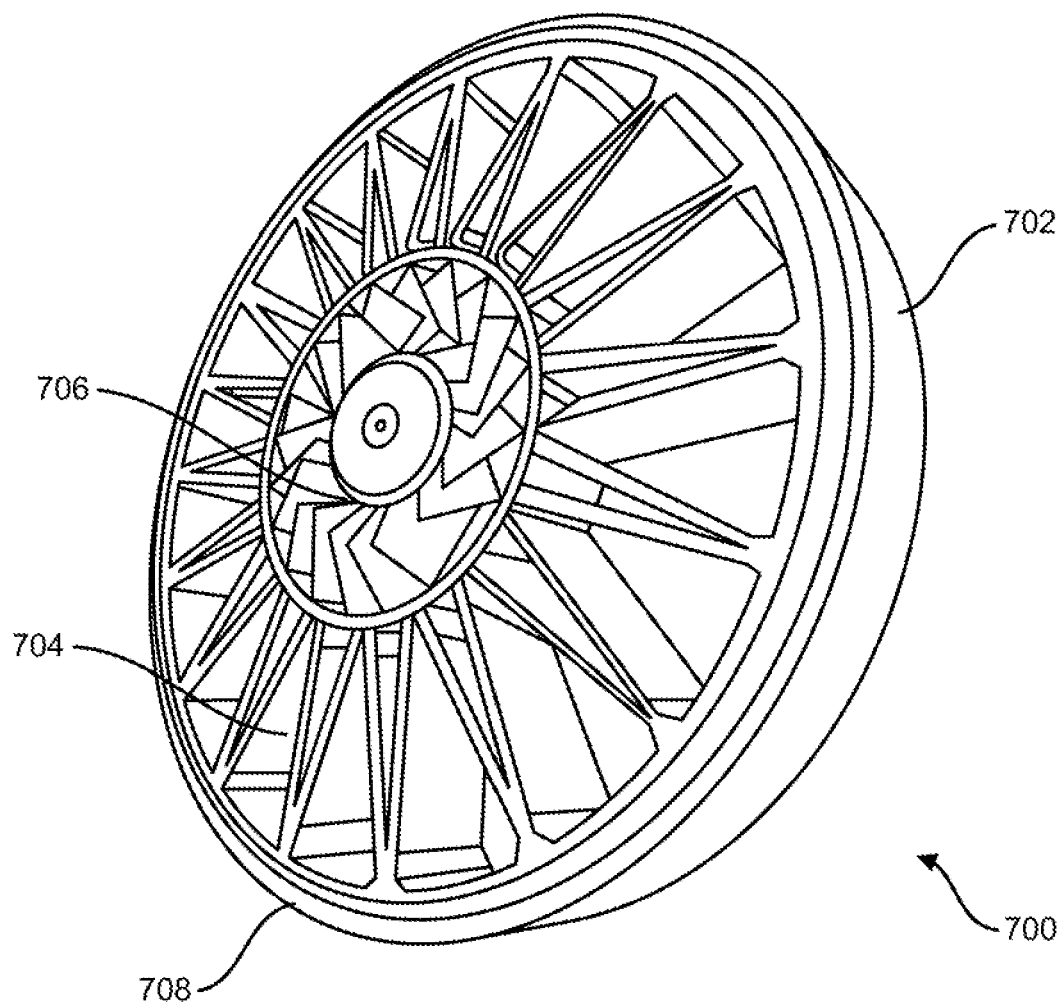
FIG. 7 is an alternate embodiment of an airless tire.

FIG. 7 shows one embodiment of a potential airless tire 700 formed from an outer tire tread 702, a flexible spoke array 704, which may be formed in a honeycomb, "star" array, lateral array, etc., a deformable wheel 706, and a sheer band 708. A solid inner hub mounts to the axle.

For example, airless tire 700 may include a polyurethane, or other polymer, spoke array 704 in a pattern of wedges or other shapes. Shear band 708 is stretched across the spokes, forming the outer edge of the tire (the part that comes in contact with the road). The tension of shear band 708 on the spokes and the strength of the spokes themselves replace the air pressure of a traditional tire. Tread 702 is then attached to shear band 708. The spokes absorb road impacts the same way air pressure does in pneumatic tires. The tread and shear bands deform temporarily as the spokes bend, then quickly spring back into shape. These wheels can be made with different spoke tensions, allowing for different handling characteristics. More pliant spokes result in a more comfortable ride with improved handling. The lateral stiffness of tire 700 is also adjustable.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A system for monitoring rolling resistance across a road comprising:
   a vehicle with at least one tire;
   the at least one tire having at least one soft elastomeric capacitor tire sensor incorporated into a structure of the tire; and
   wherein movement of the at least one tire across a road surface impacts the at least one soft elastomeric capacitor tire sensor and provides rolling resistance data for the at least one tire.

2. The system of claim 1, wherein the at least one soft elastomeric capacitor tire sensor is on an exterior surface of the tire.

3. The system of claim 1, wherein the at least one soft elastomeric capacitor tire sensor is placed within an interior structure of the at least one tire.

4. The system of claim 1, wherein the system measures energy loss that contributes to rolling resistance of the at least one tire.

5. The system of claim 1, wherein the system includes an integrated roadway section configured with a precast concreate section with at least one soft elastomeric capacitor sensor embedded within the precast concrete.

6. The system of claim 1, wherein the at least one soft elastomeric capacitor tire sensor measures strain in at least two directions.

7. The system of claim 1, wherein deformation of the at least one tire is measured using strain to determine rolling resistance.

8. The system of claim 1, wherein the at least one tire has a honeycomb formation airless support structure.

9. The system of claim 8, wherein the at least one tire is a 3-D printed tire with 3-D printed tread on an outer surface.

10. A method for calculating rolling resistance across a road comprising:

forming at least one tire having at least one soft elastomeric capacitor tire sensor incorporated into a structure of the tire;

placing the tire on a vehicle;

placing at least one force sensor within a suspension of the vehicle in communication with the at least one soft elastomeric capacitor tire sensor; and wherein movement of the at least one tire across a road surface impacts that at least one soft elastomeric capacitor tire sensor and provides rolling resistance data for the at least one tire.

11. The method of claim 10, wherein the at least one soft elastomeric capacitor tire sensor is placed on an exterior surface of the tire.

12. The method of claim 10, wherein the at least one soft elastomeric capacitor tire sensor is placed within an interior structure of the at least one tire.

13. The method of claim 10, further comprising measuring energy loss from deformation of the at least one tire that contributes to rolling resistance of the at least one tire.

14. The method of claim 10, further comprising driving the vehicle over an integrated roadway section configured with a precast concrete section with at least one soft elastomeric capacitor sensor embedded within the precast concreate.

15. The method of claim 10, wherein the at least one tire is formed with a honeycomb formation airless support structure.

* * * * *